(12) United States Patent
Waupotitsch et al.

(10) Patent No.: US 7,016,824 B2
(45) Date of Patent: Mar. 21, 2006

(54) INTERACTIVE TRY-ON PLATFORM FOR EYEGLASSES

(75) Inventors: Roman Waupotitsch, San Jose, CA (US); Mikhail Tsoupko-Sitnikov, Campbell, CA (US); Gérard G. Medioni, Los Angeles, CA (US); Oleg Mishin, Foster City, CA (US); Vladimir Shamgin, Cupertino, CA (US); Francesco Callari, Campbell, CA (US); David Guigonis, San Jose, CA (US)

(73) Assignee: Geometrix, Inc., San Jose, CA (US)

( * ) Notice: Subject to any disclaimer, the term of this patent is extended or adjusted under 35 U.S.C. 154(b) by 648 days.

(21) Appl. No.: 09/823,422

(22) Filed: Mar. 29, 2001

(65) Prior Publication Data

US 2002/0105530 A1 Aug. 8, 2002

Related U.S. Application Data

(60) Provisional application No. 60/266,799, filed on Feb. 6, 2001.

(51) Int. Cl.
*G06G 7/48* (2006.01)

(52) U.S. Cl. .............................. 703/6; 703/1; 345/419; 345/630; 705/27; 382/154

(58) Field of Classification Search .................. 705/27, 705/26; 345/435, 419, 420, 630; 351/246, 351/177, 178, 200, 204, 205, 216, 227, 224; 703/1, 6; 382/154, 190, 195; 700/182
See application file for complete search history.

(56) References Cited

U.S. PATENT DOCUMENTS

| | | | |
|---|---|---|---|
| 4,539,585 A | 9/1985 | Spackova et al. ............. 358/93 |
| 4,730,260 A | 3/1988 | Mori et al. .................. 364/518 |
| 4,845,641 A | 7/1989 | Ninomiya et al. ........... 364/518 |
| 4,852,184 A | 7/1989 | Tamura et al. ................ 382/48 |
| 4,991,005 A | 2/1991 | Smith ........................... 358/93 |
| 5,280,570 A | 1/1994 | Jordan ......................... 395/135 |
| 5,592,248 A | 1/1997 | Norton et al. ............... 351/246 |
| 5,983,201 A * | 11/1999 | Fay ............................... 705/27 |
| 5,999,185 A | 12/1999 | Kato et al. ................... 345/420 |

(Continued)

FOREIGN PATENT DOCUMENTS

FR 2 755 271 10/1996

(Continued)

OTHER PUBLICATIONS

Soatto, Stefano, System for selecting and designing eyeglass frames, Int. Filing Date Nov. 4, 1999, Int. Pub. No. PCT/US00/30330.*

(Continued)

*Primary Examiner*—Russell Frejd
(74) *Attorney, Agent, or Firm*—Joe Zheng

(57) ABSTRACT

Techniques and systems that provide interactions between a 3D representation of a selected pair of glasses and a fully-textured 3D face model are disclosed. According to one embodiment, an interactive platform is displayed to allow a user to select a pair of glasses and try the selected glasses on a user-provided 3D face model. The interactions provided in the platform include spatial adjustments of the glasses around the face model, various perspective views of the 3D face with the glasses on and other cosmetic alternations to the selected glasses. According to one application, when the user finishes the try-on process, the information about the glasses can be transmitted to a business that can subsequently produce a pair of customized glasses for the user.

34 Claims, 16 Drawing Sheets

U.S. PATENT DOCUMENTS

| | | | |
|---|---|---|---|
| 6,072,496 A | 6/2000 | Guenter et al. | 345/419 |
| 6,095,650 A * | 8/2000 | Gao et al. | 351/227 |
| 6,111,581 A | 8/2000 | Berry et al. | 345/419 |
| 6,142,628 A * | 11/2000 | Saigo | 351/204 |
| 6,144,388 A | 11/2000 | Bornstein | 345/435 |
| 6,208,347 B1 | 3/2001 | Migdal et al. | 345/419 |
| 6,226,001 B1 | 5/2001 | Bardon et al. | 345/419 |
| 6,231,188 B1 | 5/2001 | Gao et al. | 351/227 |
| 6,492,986 B1 * | 12/2002 | Metaxas et al. | 345/420 |
| 6,518,963 B1 * | 2/2003 | Waupotitsch et al. | 345/419 |
| 6,529,192 B1 * | 3/2003 | Waupotitsch | 345/419 |
| 6,563,499 B1 * | 5/2003 | Waupotitsch et al. | 345/420 |
| 6,664,956 B1 * | 12/2003 | Erdem | 345/419 |

FOREIGN PATENT DOCUMENTS

| | | |
|---|---|---|
| JP | 01076362 | 3/1989 |
| JP | 06118349 | 4/1994 |
| JP | 06139318 | 5/1994 |
| JP | 06290239 | 10/1994 |
| JP | 11007466 | 1/1999 |
| JP | 2000123053 | 4/2000 |
| WO | WO 00/04506 | 1/2000 |
| WO | WO 00/04508 | 1/2000 |
| WO | WO 00/49544 | 8/2000 |
| WO | WO 01/32074 | 8/2000 |
| WO | WO 00/77744 A1 | 12/2000 |

OTHER PUBLICATIONS

Weaver, Christopher, Method and system for a computer-rendered three-dimensional mannequin, Int. Filing date Jun. 1, 2000, Int. Pub. No. PCT/US00/40022.*

Ellis, Peter, R. Product Configuration Display system and method, Int. Filing Date Feb. 16, 1999, Int. Pub. No. PCT/US00/03828.*

Bakic et al., V. Real-time tracking of face features and gaze direction determination, Fourth IEEE Workshop on Applications of Computer Vision, WACV '98, Oct. 1998, pp. 256-257.* http://www.eyeweb.com/.

http://www.eyeglasses.com/.

http://www.tryoneyeglasses.com/.

A search report dated May 16, 2001provided by a searcher who performed the prior art search.

Gary, S., "The Virtual Reality Design Studio," Industrial Electronics, 1997, ISIE' 97, Proceedings of the IEEE International Symposium on Guimaraes, Portugal, Jul. 7-11, 1997, NY, NY, USA IEEE, pp. SS238-SS243 (ISBN: 0-7803-3936-3).

* cited by examiner

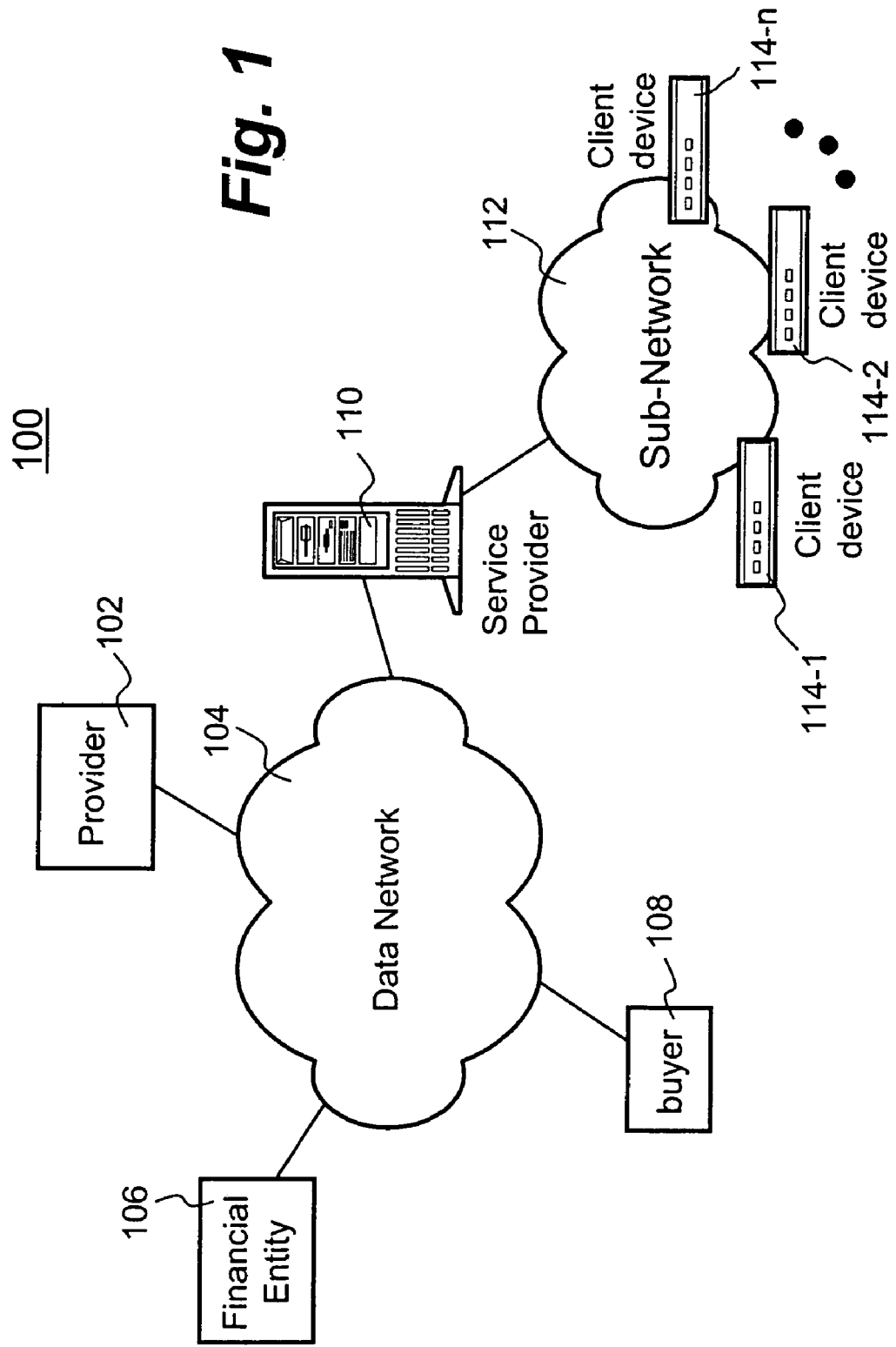

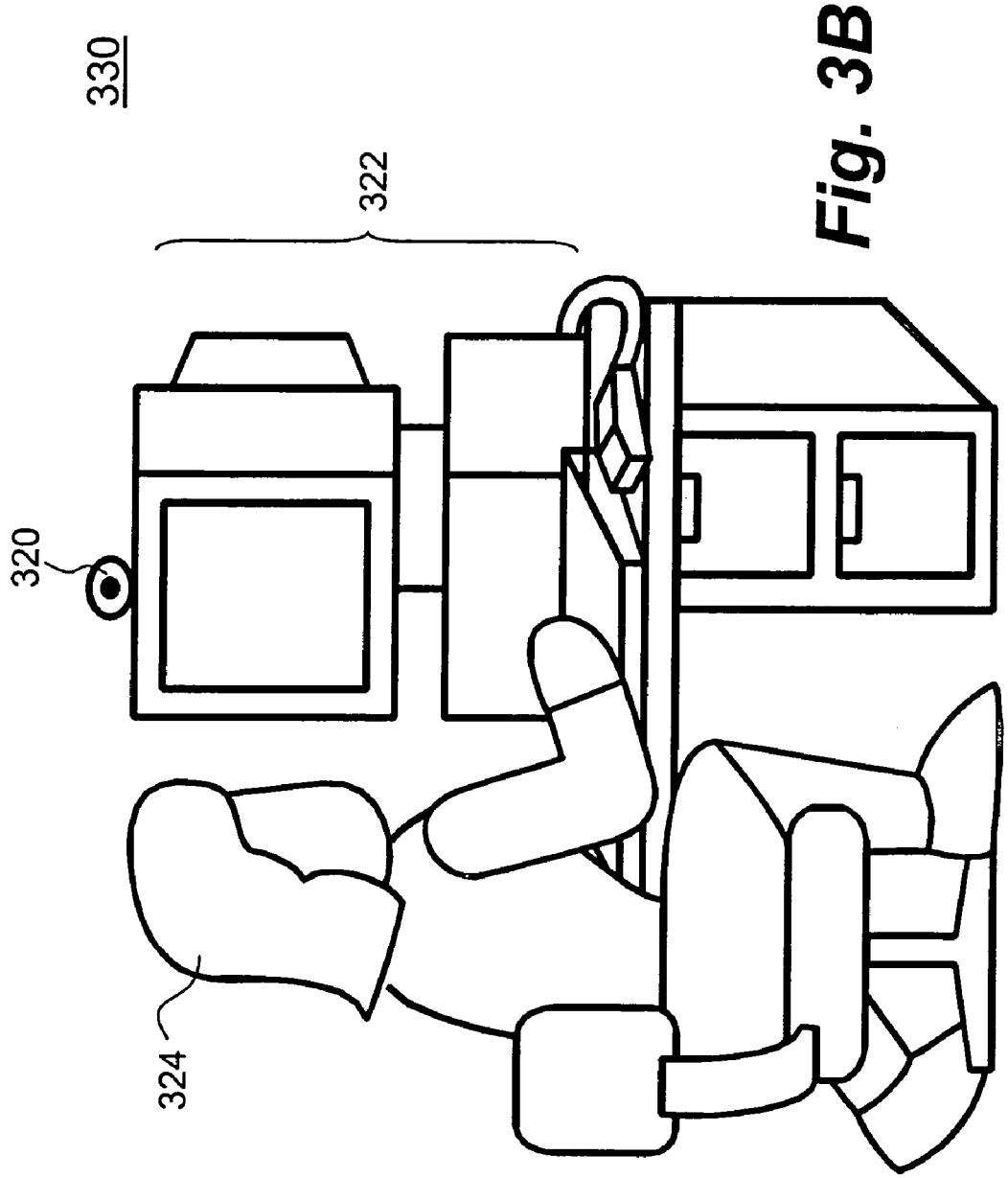

INTERACTIVE TRY-ON PLATFORM FOR EYEGLASSES

CROSS-REFERENCE TO RELATED APPLICATION

This application claims the benefits of the provisional application, No. 60/266,799, entitled "Interactive 3D Models for Online Commerce", filed Feb. 6, 2001, which is hereby incorporated by reference for all purposes.

BACKGROUND OF THE INVENTION

1. Field of the Invention

The present invention generally relates to the area of electronic commerce and more particularly relates to an interactive test or try-on platform in which a user can try on eyeglasses of different styles on a 3D face model provided by the user, wherein the 3D face model is preferably generated from the user so that the user can electronically and interactively try on a selected pair of glasses.

2. Description of the Related Art

The Internet is a data communication network of interconnected computers and computer networks around the world and is rapidly evolving to the point where it combines elements of telecommunications, computing, broadcasting, publishing, commerce, and information services into a revolutionary business infrastructure. The economy on the Internet is growing in every aspect of life, a wide range of businesses including stock trading, commodities, products, retails and services ordering are all via the Internet.

The growth of Internet-based electronic commerce, however, is experiencing some obstacles when coming to certain types of services and goods. For example, it would be very difficult for a business to promote wearable goods online, such as footwear, glasses and accessories. When buying expensive leather shoes, very few consumers would order a pair over the Internet. One of the reasons is that everyone has developed his/her own shaped feet through years of walking habits. Generically sized shoes could hardly fit comfortably on everyone's foot. On the other hand, the markets for the shoe manufacturers and businesses are limited to certain geographic areas. Eyeglasses are another example. Unless it is a pair of generic sunglasses, very few consumers would order personalized glasses, such as near-sighted glasses, over the Internet. Similar reasons are applied because a consumer likes to try on a pair of chosen glasses and see from a mirror how he/she looks with the chosen pair, hence the market for eyeglasses is primarily limited to local retailing. Indeed, there are many other consumer products and industrial goods or services that are being limited to local markets because the current Internet-based commerce platform lacks "try on" experiences. There is, therefore, a need for a mechanism that a user or buyer could "try on" or test a selected item or service over the Internet before a commitment to the selected item can be made.

SUMMARY OF THE INVENTION

The present invention relates to techniques and systems that provide interactions between a 3D representation of an item being selected and a fully-textured 3D model of an object. The present invention can be used advantageously for electronic commerce over the Internet, wherein a business can provide a 3D representation of an item for a user to virtually try or test on an object. As a result, a user can visually perceive subsequent effects of the item on the object.

According to one embodiment, an interactive presentation or platform including a 3D representation of an item and a 3D model of an object is provided. The item is selected by a user for the object. In other words, the item may be worn by, attached to or joined with the object preferred by the user. Within the interactive presentation, the user can try or test the item on the object by, perhaps, adjusting spatially or manipulating the item in a 3D space. Further the interactive platform provides a view of the object with the item on from any selected perspective.

According to another embodiment, an interactive platform designed for 3D representations of eyeglasses is provided. The platform allows an import of a 3D face model of a user (e.g. a potential buyer). Within the interactive platform, the user can select a pair of glasses expressed in a 3D representation and try or test the glasses on the provided 3D face model. In particular, a default position of the glasses is provided with respect to the 3D face model. At "OFF" position, a pair of glasses is placed in front of but off the face model. At "ON" position, the glasses is placed onto the face model. As a result, the user can feel the process in which the glasses is being tried on the 3D face. Further the interactive platform allows the user to adjust the glasses spatially with respect to the face model as well as to visualize the combined 3D models (e.g. the glasses on the face model) from any selected perspective.

The present invention may be implemented as a method, an apparatus, a system or a computer product. Different implementation may yield one or more of the following advantages and benefits. One of them is the interactive presentation mechanism that permits a user to try or test visually or graphically an item selected for a preferred object with respect to the object itself. The feature is believed to be significantly different from some existing web sites that offer "try-on" experiences on a generic object. The present invention offers the user a mechanism to supply a 3D model of the real and specified object. For example, when the item is a wearable product and the object is the user himself/herself, the user can perceive how he/she may look like with the wearable product. Another advantage or benefit provided by the present invention is the marketing opportunity of certain type of goods or services that would otherwise be limited to local retailing. With the present invention, these goods or services can now be offered online so remote users can "feel" these goods or services over the Internet.

Other advantages, objects and features of the present invention, together with the foregoing, are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 1 shows a system configuration in which the present invention may be practiced;

FIGS. 3A and 3B show respectively two possible settings to generate a 3D representation of an item or a 3D model of an object;

DETAILED DESCRIPTION OF THE PREFERRED EMBODIMENTS

Figure 2A:
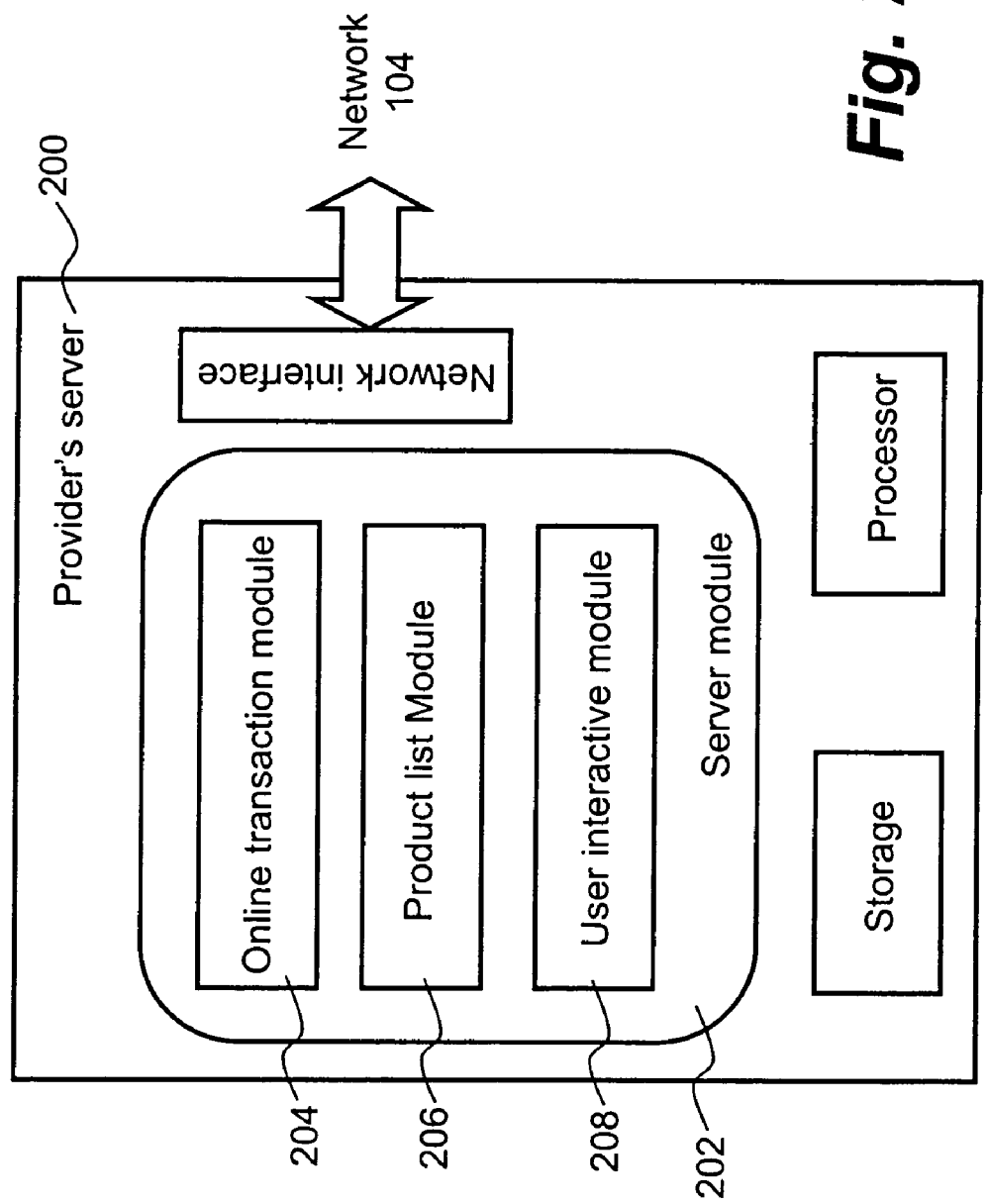
FIG. 2A shows a functional diagram of a provider's server according to one embodiment of the present invention.

The invention relates to techniques, systems or platforms that provide interactions between a 3D representation of an item being selected and a fully-textured 3D model of an object for electronic commerce over the Internet. An item or items herein mean that products or services are offered by a business online so that potential users or buyers may consider acquiring or using the products or services. The examples of such items may include, but not be limited to, wearable items for consumer, industrial parts for devices or services or any physical thing that may require a fitting trial on the object before a user or buyer may consider acquiring or using the item(s). An object herein means a potential receiver of the selected item(s). Examples of such object may include, but not be limited to, a user himself/herself to wear the selected item and a device to install the selected item.

In particular, the present invention is implemented to facilitate electronic commerce of eyeglasses. A user is provided with an interactive try-on platform that permits an import of a 3D face model, preferably, of a potential wearer of a pair of eyeglasses. By virtue of the present invention, the interactive platform allows the user to select a pair of glasses, try the selected glasses on the face model, adjust the glasses spatially and view the face model with the glasses on from any chosen perspective.

The present invention can be advantageously used in electronic commerce over a data network. With the employment of the present invention, a business can now offer through the data network many other items that would otherwise be limited to local retailing. Not only does the present invention now help a business reach more markets without physical boundaries but also provide remarkable convenience to buyers who could now try on different selections without leaving their home or office.

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Referring now to the drawings, in which like numerals refer to like parts throughout the several views. FIG. 1 shows a system configuration 100 in which the present invention may be practiced. As used herein, a service or product provider, or simply referred to as a provider represents one of numerous businesses, entities, merchants or retailers that offer various products, applications and services online. Examples of such a provider may include www.amazon.com that offers items from books to consumer electronics, www.ebay.com that offers an auction platform where bidders and sellers can interact with each other.

As shown in the figure a provider 102, typically through a server computer, is coupled to a data network 104 that may be the Internet or a network of private and/or public networks. To facilitate online transactions between the provider and a user (e.g. a consumer), a third party entity 106, also through a server computer, may be coupled to network 104. Third party entity 106 may represent a financial or authorized institution, such as a bank, a credit card authority or an agent, that provides a mechanism for the provider to verify various information submitted by the buyer for a transaction or to electronically proof anything required by the provider from the user.

As used herein, a transaction means an electronic agreement mutually agreed between two entities. For example, a transaction occurs when a provider accepts an order of certain items from a user or buyer. Likewise a transaction is deemed to occur when pertinent data/information entered/provided by the buyer is released to the provider after the buyer has tried on and decided to acquire his/her selections. In general a "try on" or "test" means a process in which the user tests an item in accordance with a set of criteria determined by the user. For example, a buyer is buying a pair of glasses. Before a transaction happens, the buyer wants to make sure how he/she may look like after he/she wears the glasses on. Hence a "try on" or a test with the object happens.

For illustration purpose, a user 108 communicates with provider 102 through a computing device, referred to as a client device, that may include, but not be limited to, a personal computer, a palm-size computing device, a wireless mobile device and a personal data assistant (PDA), having a display screen and capable of two-way data communications with data network 104 for ordering and browsing electronically products or services offered by an online business.

To facilitate the description of the present invention, it is defined herein a display screen or simply a screen is the physical display apparatus in a device, such as a 15 inch CRT or LCD monitor, commonly seen with a personal computer. Likewise, a screen display or simply display is an image presented on the display screen. For example, a file that constitutes a display or part of the display may be an HTML, a VRML file, or a plurality of data representing a 3D representation for an item or a 3D model of an object. A display is displayed on a screen when the file is read or executed by an application or executed by a browser.

For completeness, a service provider or a business unit 110, also through a respective server computer, is coupled between network 104 and sub-network 112. Typically, sub-network 112 that may be part of network 104 or a local area network (LAN) belonging to a locality serves its own community comprising a number of client devices 114 (i.e. 114-1 to 114-n), each representing an access to the service provider from a user or a consumer. In general, each of client devices 114 may be a personal computer, a palm-size computing device, a mobile device or a cable control box facilitating Internet services via a cable. Via service provider 110 that may be an Internet service provider, a wireless carrier, a cable service provider, or any data service provider, each of client devices 114 can communicate with provider 102 for ordering, viewing and browsing electronically a product or a certain type of services offered by provider 102.

Referring now to FIG. 2A, there is shown a functional block diagram of a provider's server 200 according to one embodiment of the present invention. Server device 200 may be a server computer or a workstation hosted by provider 102 of FIG. 1 to offer products for sales or services online. In one embodiment, server device 200 is offered from Sun Microsystems of Mountain View, California and loaded with a server module 202 that may be configured to include an online transaction module 204, an item list module 206 and an user interactive module 208. Online transaction module 204 may be any one of the commercially available or customized applications that facilitate transactions with a client device over a network. One exemplary online transaction module 204 may be from Oracle Corporation in Redwood, Calif. and commonly used in many of the frequently visited web sites.

Figure 2B:
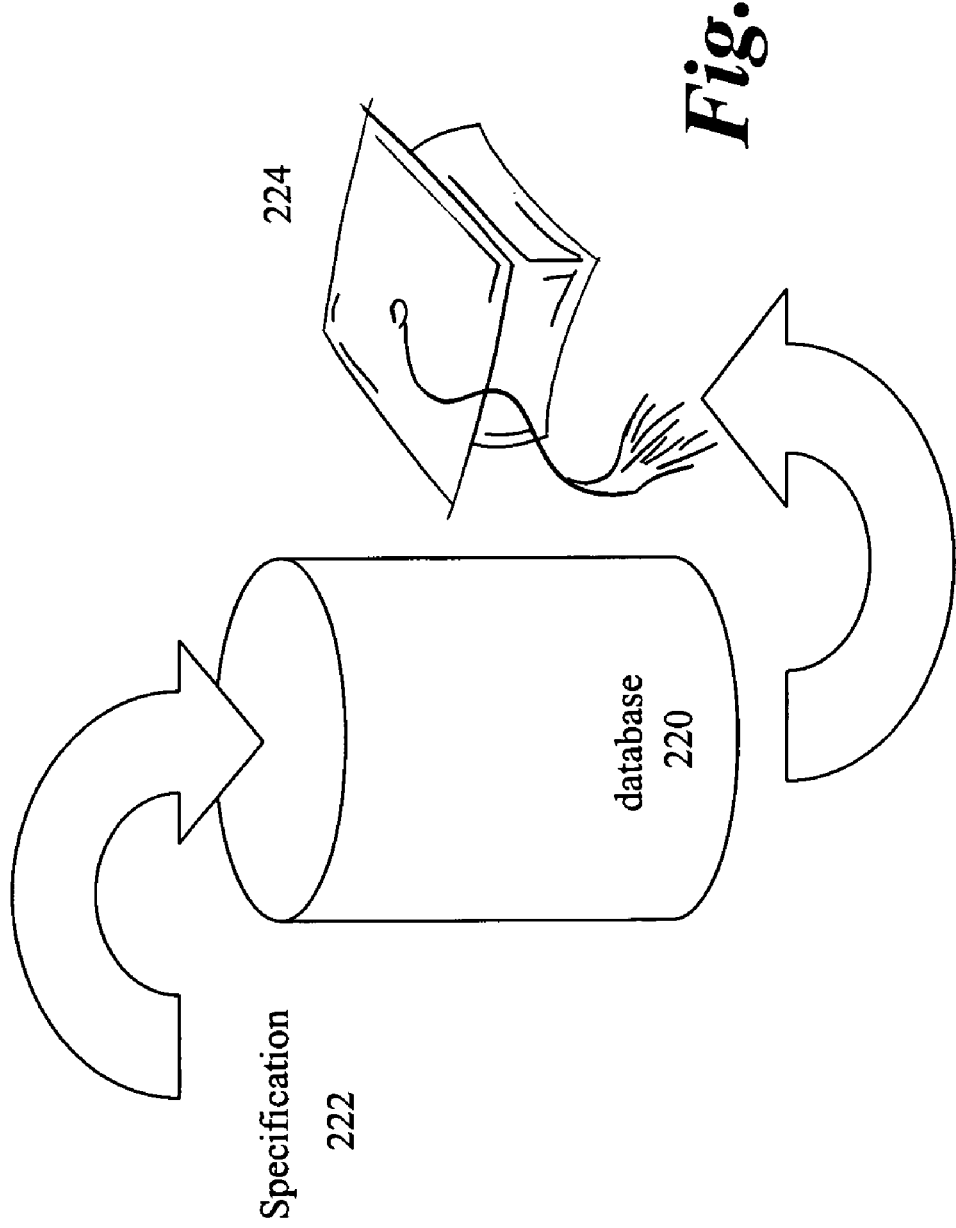
FIG. 2B shows essential functions of a user interactive module in a provider's server according to one embodiment of the present invention.

The functions of user interactive module 208 is illustrated in FIG. 2B according to one embodiment of the present invention. User interactive module 208 receives a specification from a user, for example, a hat with size A, style B and color C. Upon receiving the specification, user interactive module 208 inputs the specification to a database 220 that maintains a list of items for offering over the network. Generally, the items maintained in database 220 has respective specifications and may be categorized in a way that depends on what business the items fit into.

According to one embodiment of the present invention, at least one of the items is associated with a 3D representation or a 3D model, which means the item is represented graphically in 3-dimensions. The 3D representation of the item is preferably generated in advance by one of the settings provided below or through a 3D modeling service such as Geometrix, Inc. (see www.geometrix.com). The 3D representation may be expressed by one or more files in one of the 3D object formats such as VRML (Virtual Reality Modeling Language) and RWX (MEME Shape file). In one implementation, the 3D representation is expressed as a Cult3D object file. Cult3D object file is supported by Cult3D Viewer or Cult3D Exporter offered by Cult3D Inc. (see www.cycore.com). After a user selects an item, the 3D representation thereof is retrieved from the database and transported to an interactive environment (i.e. a presentation) as will be further described below.

In database 220, detailed information of the item matched by the specification is located and retrieved. It is assumed that the specified item is associated with a 3D representation 224 as shown in FIG. 2B. The detailed information now includes the 3D representation in addition to, perhaps, price, manufacturer, date or other related information about the selected item. In one embodiment, 3D representation 224 can be transported over a network and subsequently displayed along with other related information on a client device used by the user, wherein the client device is executing an application or browser to view the 3D representation.

To facilitate the description of the present invention, a 3D model of an item to be tried on an object is referred to as a 3D representation. In operation, user interactive module 208 will require a 3D model of an object that is to receive the selected item. According to one implementation, the 3D model of the object is provided by the user from a known location (e.g. from a local hard disk). In that case, the 3D model of the object is pre-generated. In another implementation, the 3D model of the object is generated on demand.

Figure 3A:
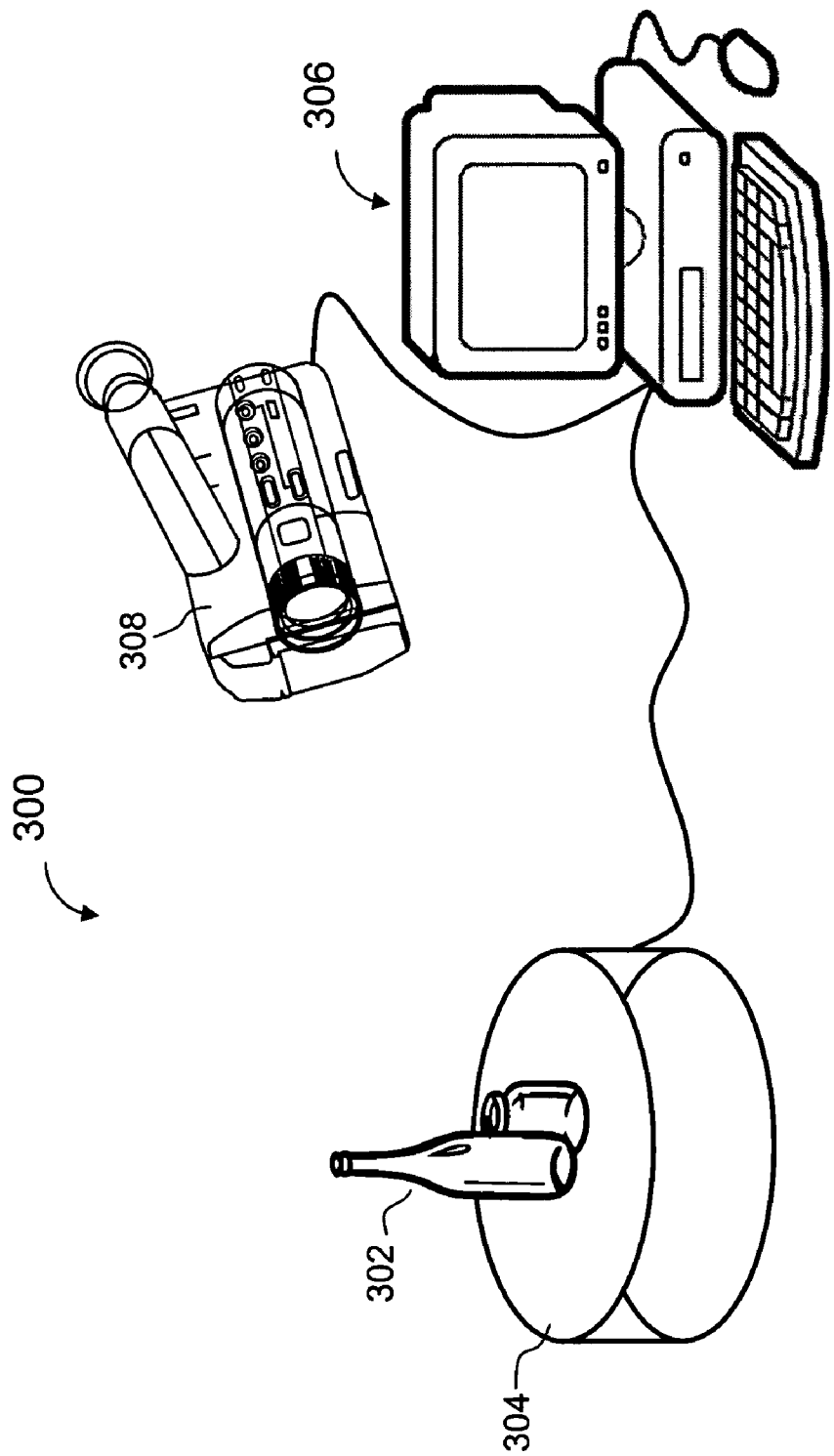

FIG. 3A illustrates an exemplary setting 300 that may be used to generate a 3D model of the object or one or more of the items for selection. An item 302 to be modeled electronically may be a combination of one or more 3D objects such as toys, products or devices. Item 302 is placed on a turntable 304 that is preferably controlled by a stepper motor (not shown). The stepper motor operates under the control of a computer system 306 to rotate turntable 304 so that object 302, when being turned around, can be viewed and imaged by an imaging system 308. Subsequently imaging system 308 produces a surrounding imagery comprising a number of side view images, each taken at a predetermined relative position of object 302 with respect to imaging system 308. The images are then processed in computer system 306 that is loaded with a 3D modeling application. The detail description of the setting 300 as well as the 3D modeling application is provided in U.S. application Ser. No. 09/357,528, entitled "Method and System for Generating Fully-Textured 3D Models" by Zwern et al, which is hereby incorporated by reference in its entirety.

FIG. 3B illustrates another exemplary setting 330 that may be used efficiently to generate a 3D model of the object offline or on demand. A camera system 320 is coupled to a client device 322 that may be coupled to the network. In particular, the client device is loaded with a 3D modeling application that generates a 3D model of an object. One exemplary 3D modeling application called FaceCapture from Geometrix, Inc. (see www.geometrix.com) in San Jose, Calif., can be executed in client device 322 and generates a 3D model based on one or two images of the object. As shown in the figure, a user 324 who may be an object can generate a 3D model of his/her face using the camera system 320 and the 3D modeling application. As a result, a fully-textured 3D model of the face is generated, an example thereof will be shown below. As used in some embodiments, setting 330 may be used to generate 3D models of other objects.

It is now evident to those skilled in that art that the setting in FIG. 3A or 3B can be used to generate a 3D representation of an item as well as the object. To facilitate the description of the present invention, two words "3D representation" and "3D model" are used to distinguish 3D information presented from two ends (i.e. the server and the client). In reality, they can be interchangeably used and may be represented in the same format or two compatible formats. Also it should be noted that the setting in FIGS. 3A and 3B are for examples only. There may be other ways or tools that can be used to generate a fully-textured 3D model of an object that includes a human being or an article. What is important herein is the use of such 3D models to support electronic commerce over a network. In addition, as will be further described below, it is one of the features in the present invention that an interactive environment is provided that a user can try, test, or manipulate virtually and graphically the 3D representation of a selected item on the 3D model of an object provided by the user. An integrated representation of the 3D model with the 3D representation on can be viewed or browsed from any perspective in a 3D space. In some sense, the user could perceive what might be subsequent effects when the item and the object are actually attached, joined, connected or affiliated.

Figure 4:
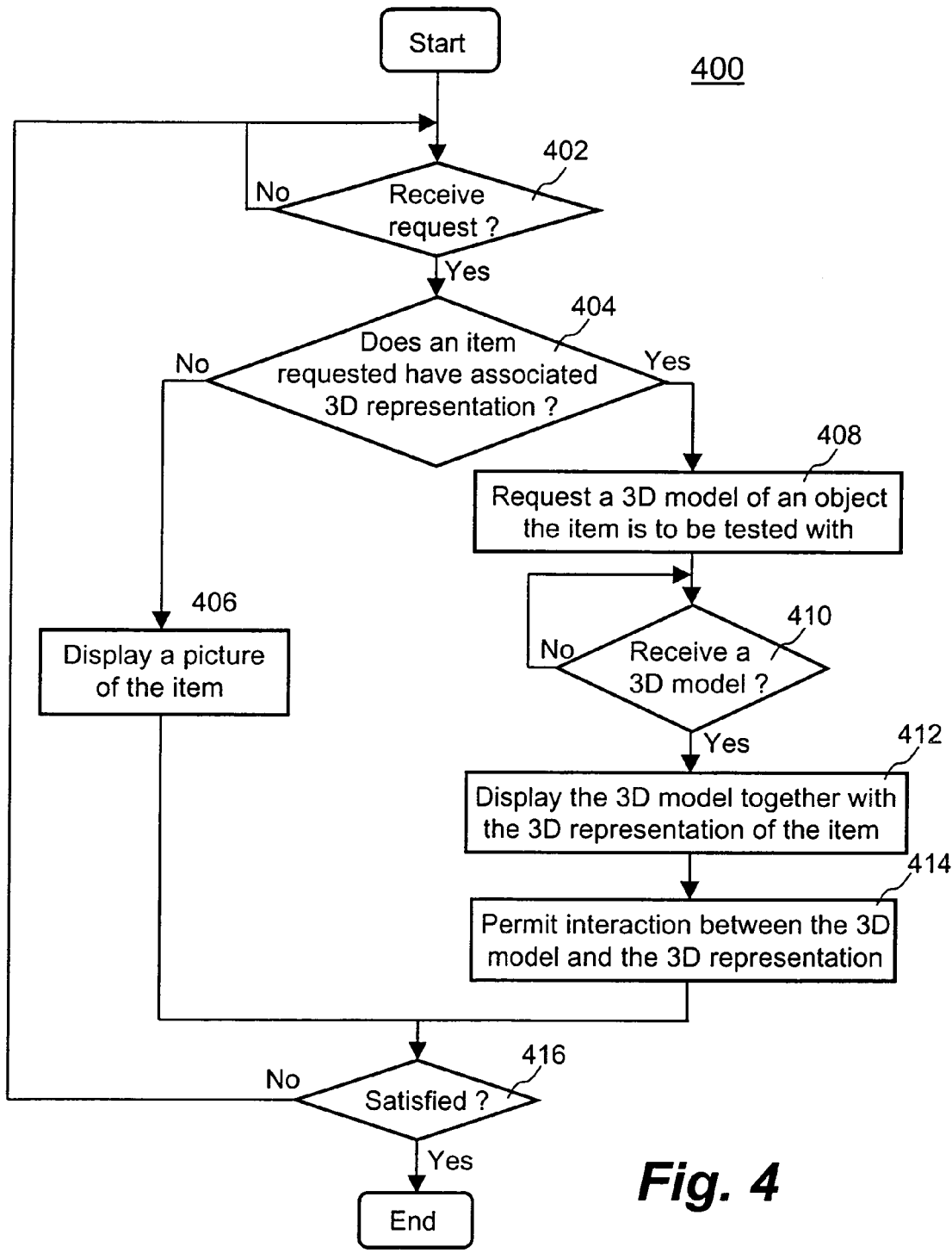
FIG. 4 is a process flowchart of operations on a server device that offers items over a data network.

FIG. 4 is a process flowchart 400 of operations, according to one embodiment of the present invention, on a server device that offers items or services over a data network and shall be understood in conjunction with the preceding figures. The server device may correspond to server device 104 of FIG. 1. In a preferable embodiment, process 400 is implemented as a server module 202 of FIG. 2A. At 402, process 400 awaits a request from the network. When a request comes, process 400 proceeds. In one embodiment, the request is an HTTP request and the network is the Internet. The request is typically sent from a client device associated with a user. It is assumed that the user has made a selection after browsing a category or a list of items being offered online by the server device. In addition to a specification of the selected item, the request includes an IP address identifying the client device or an identifier identifying the user. Upon receiving the request, the specification is extracted and process 400 goes to, perhaps, a database to look up for the selected item.

At 404, a search response to the request comes back and indicates if the selected item has an associated 3D representation. It is noted that it is not necessary for the server device or a business to offer items each of which must have a 3D representation for a user to test with an object. When the search response shows that the selected item has no associated 3D representation thereof, process 400 goes on to 406 that may simply display a picture of the selected item. Although a picture is not necessary for a selected item, it is generally preferable to show to the user what the selected item may look. At 416, process 400 needs to know if the user is satisfied with the selected item or pleased with the picture along with various product related information. If the response from the user is positive, process 400 moves along, for example, to enter a transaction with the user or other mutually agreed arrangement. If the user is not satisfied with the selected item, process 400 goes back to 402 to await another selection (i.e. a new request).

Referring back to 404, the search response comes back and indicates that the selected item has an associated 3D representation. Process 400 moves on to 408 to see if there is a 3D model of an object available for trying on the selected item. The 3D model may be locally available (e.g. pregenerated or generated on demand) in the computing device that the user is using or remotely available in the server device or another computing device coupled to the network.

Depending on an exact implementation, the 3D model of an object may be located in a known location. For example, the user is looking for a fancy spoiler for his car. A 3D model of the car may have been generated using the setting in FIG. 3A. The 3D model is then stored in a hard disk or another computer accessible by the user when the 3D model is needed. The 3D model can now be loaded to test with the spoiler (i.e. the 3D representation thereof). The purpose is to let the user see how the car may look with a selected spoiler before a transaction takes place. In another application that will be further described below, a user is looking for a pair of glasses. After the glasses is selected, process 400 now checks if there is a 3D model of the face of someone (e.g. the user). The 3D model could be generated on demand using the setting illustrated in FIG. 3B or loaded from a known location.

At 408, if process 400 determines that there is a 3D model available for trying on the selected item, process moves to 412. On the other hand, when process 400 determines that there is no 3D model available for trying on the selected item, process 400 moves to 408 to request the import of the 3D model.

At 410, process 400 awaits the availability of the 3D model. According to an option in one embodiment, process 400 checks if the format of the 3D model is supported or not at 410. Once the 3D model is successfully loaded, an interactive presentation is provided at 412 and subsequently displayed on the client device. There are at least two possible implementations for 412. The first one is to upload the 3D model to the server device in which the server module performs an integration process to combine the 3D representation of the item with the uploaded 3D model of the object and then present them in an interactive environment for the user to continue. The second one is to have the interactive environment downloaded to the client device wherein the interactive environment has a placeholder for the 3D model. Once the 3D model is supplied, the interactive environment integrates the 3D model with the 3D representation. The user can now interact with the interactive environment. Regardless of the exact implementation, the interactive environment shows a combined or integrated view of the 3D representation and the 3D model.

At 414, the user is allowed to move either one of the 3D representation and the 3D model with respect to the other in the interactive environment. In one application, the user moves the 3D representation or 3D model spatially with respect to the 3D model or the 3D representation, respectively. In another application in which a customized part is required for the object, the interactive environment permits the user to modify the shape of the selected item for, perhaps, best fitting into the object. The exact manipulation of the 3D representation with respect to the 3D model does not affect the operations of the present invention. In any case, the manipulated, joined or integrated representation of the 3D representation and the 3D model can be viewed or browsed from any perspective so that the user could have a complete visual coverage of the subsequent effects or fitting of the item with the object.

Similar at 416, process 400 needs to know if the user is satisfied with the selected item or pleased with the complete visual coverage along possibly with other information. If the response from the user is positive, process 400 moves along, for example, to enter a transaction with the user or other mutually agreed arrangement. If the user is not satisfied with the selected item, process 400 goes back to 402 to await another selection (i.e. a new request).

Figure 5A:
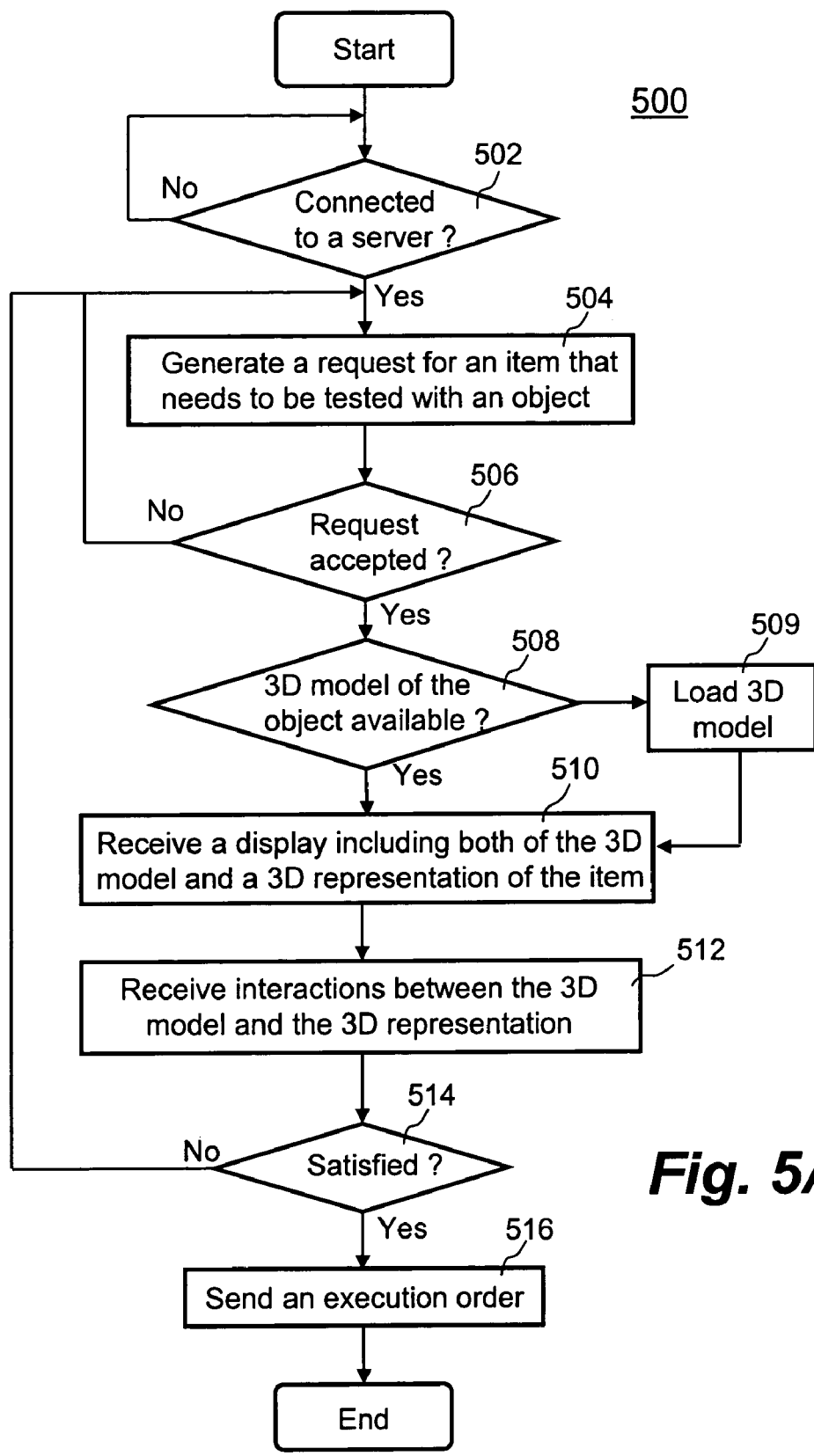
FIGS. 5A and 5B show respectively two processes of operations on a client device according to one embodiment to the present invention.

FIG. 5A is a process flowchart 500 of operations, according to one embodiment of the present invention, on a client device used by a user to test or try on a selected item offered over a network by a server device and shall be understood in conjunction with the preceding figures. The client device may correspond to any of 108 or 114 in FIG. 1. At 502, process 500 needs to ensure that a data link has been established with the server device over the network. According to one embodiment, the client device executes a browser application that provides an HTTP link over the Internet. Once the web site hosted by the server device is connected, pages (e.g. HTML) are displayed and can be browsed. At least one of the pages may show a category or a list of items being offered online by the server device identified by an address identifier (e.g. a Universal Resource Identifier or Locator). The user may be interested in exploring one of the items and hence selects thereon (e.g. via a pointing device to activate a link underneath) or enter a specification to specify an item. The client device then generates a request at 504. In addition to a specification of the selected item, the request includes an IP address identifying the server device, the client device and/or the user.

At 506, the client device or the user awaits a response from the server device to the request. As indicated in FIG. 4, process 400 needs to look up for the selected item based on the specification. Once the item is located, specifically, the item with an associated 3D representation is located, a response to the request is returned from the server device. Depending on an exact implementation, the response may include the 3D representation and activates the interactive environment that may require a 3D model from the user. At 508, process 500 checks if a 3D model of an object to be tested with is available. When the 3D model the object is ready, the user can now test or try the selected item with the supplied object. If the 3D model is not readily available, process 500 will go to 509 to request for such 3D model.

Figure 5B:
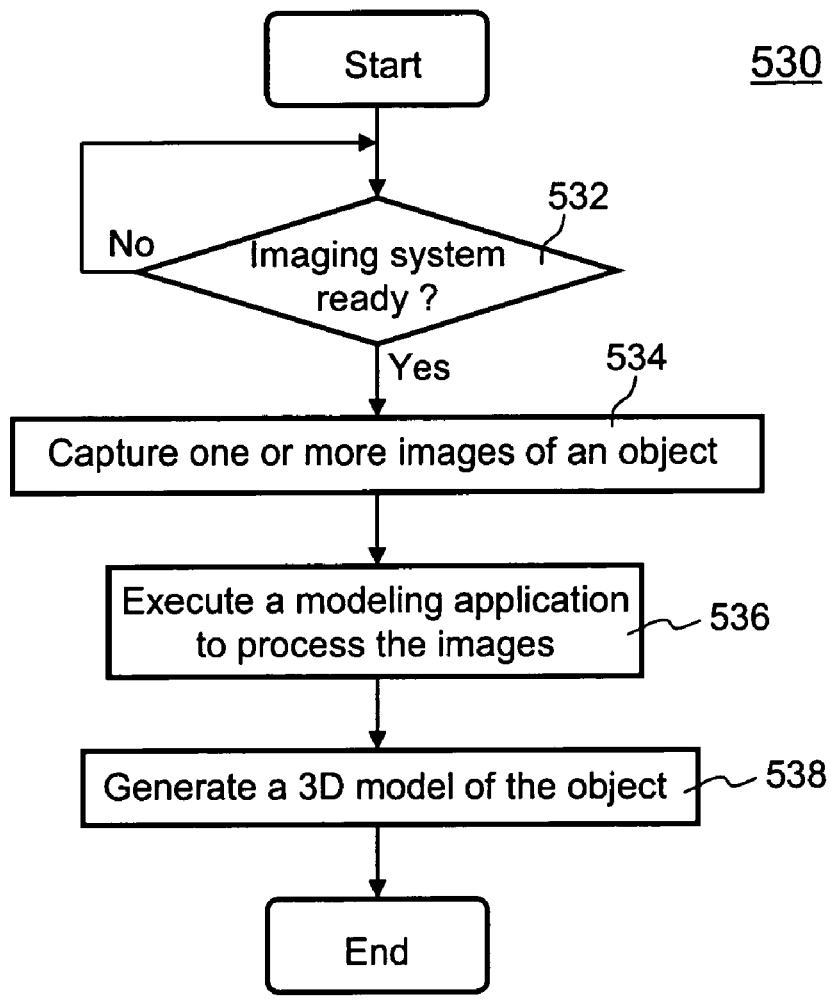

Referring now to FIG. 5B, there is shown a process flowchart 530 of providing the 3D model of the object according to one embodiment of the present invention. Process 530 shall be understood in conjunction with the setting in FIG. 3A or 3B. At 532, process 530 examines if an imaging system is ready, namely if it is calibrated or aimed at the object to be modeled. At 534, the imaging system takes one or more images of the object. Depending on the setting or the 3D modeling application in use, the imaging system may take two images (e.g. for stereo imaging) or a sequence of images surrounding the object. The 3D modeling application is then executed on the images at 536 to generate a 3D model of the object at 538. According to one embodiment, the 3D model is presented in Cult3D object format and can be viewed by Cult3D viewer. According to another embodiment, the 3D model is presented in a format supported by pulse3D viewer provided at www.pulse3D.com.

Referring now back to FIG. 5A, after it is determined that the 3D model is available, an interactive platform including both of the 3D representation and the 3D model is displayed on a display screen of the client device at 510. The interactive platform permits the user to get the item onto the object, adjust spatially in a 3D space the 3D representation or the 3D model with respect to each other, respectively at 512. In one embodiment, the 3D representation of the item is adjusted left/right, up/down and back/forth till the user feels an appropriate fitting is reached. Further the interactive platform permits the user to view or browse the jointed presentation of the 3D representation and the 3D model from any perspective the user prefers.

At 514, process 500 determines if the user is satisfied with the selected item. If the user does not like the selected item or wants to have another selection, process 500 goes to 504. If the user is satisfied with the selected item, process 500 goes to 516 that may enter a transaction between the user and the business hosting the web site.

Figure 6A:
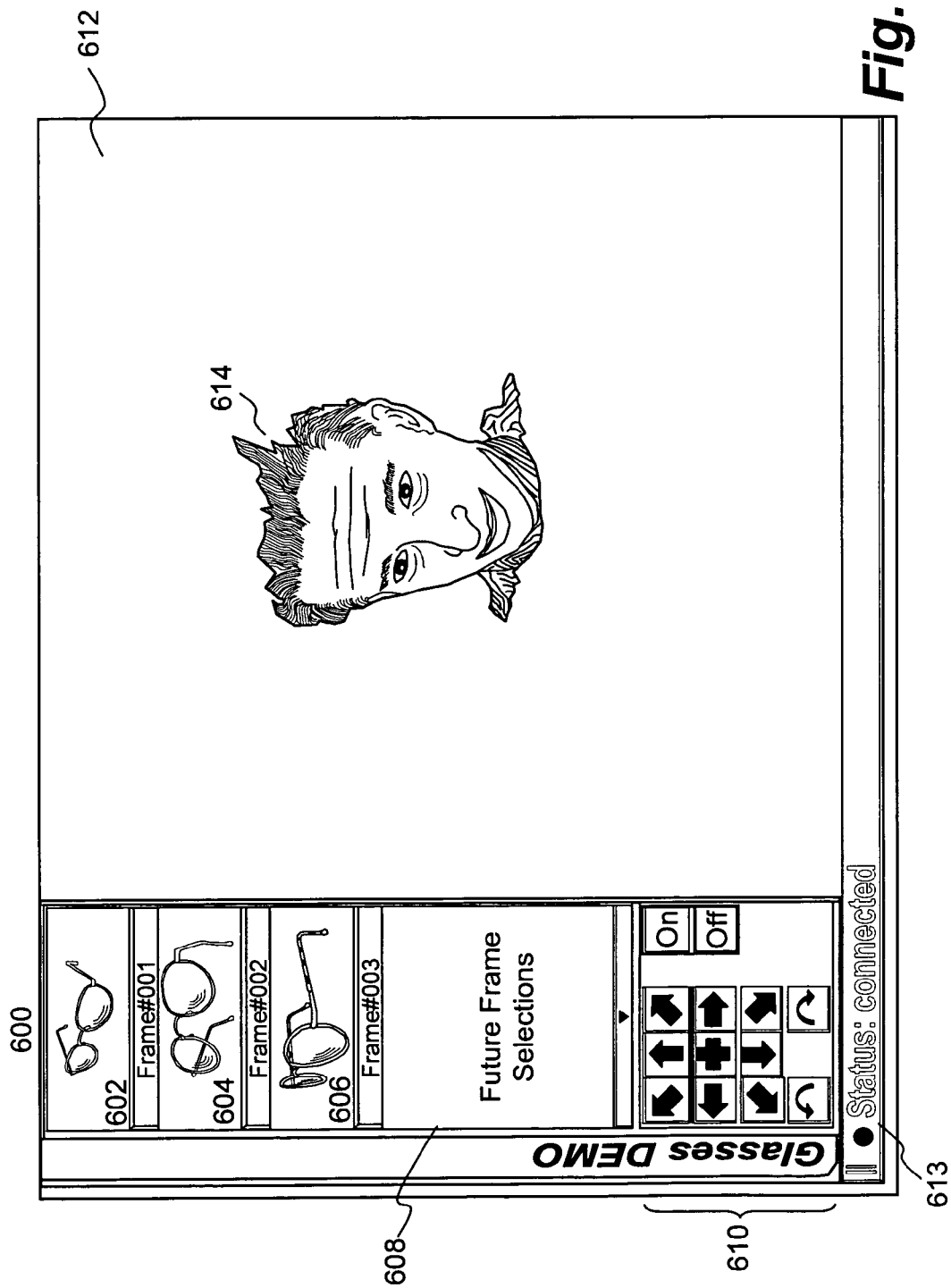
FIGS. 6A to 6E show, as an example, a sequence of interactive presentations, each including a selected eyewear and a human face according to one embodiment to the present invention.

According to one embodiment of the present invention, FIGS. 6A–6E illustrates a sequence of interactive environments or displays that may be displayed on the display screen of a client device. In FIG. 6A, an interactive platform 600 displayed as a web page includes a list of 3 glasses that are respectively presented by pictures or 3D representations thereof 602, 604 and 606. Web page 600 further includes a selection area 608 and a manipulation table 610 in addition to an interactive representation area (i.e. interactive environment) 612. Optionally, web page 600 indicates a connection status 613 of the client device with a server device hosted, presumably, by an eyewear business.

It is assumed that at least one or each of the three initially displayed glasses has an associated 3D representation. A testing object for the glasses is evidently a human face. A 3D model of an object (i.e. a human face) 614 has been provided for testing a selected pair of glasses. As described above, 3D face model 614 may be generated on demand using the method of FIG. 3B or pre-generated or transferred from another device/memory. Interactive platform 600 permits an import of 3D face model 614 into interactive representation area 612 as such the user is now able to try on a selected pair of glasses.

Generally, it is not easy to put a selected glasses right onto 3D face model 614 initially through a pointing device (e.g. a mouse) depending on the exact orientation of the 3D face model. As one of the features of the present invention, a default position of the selected glasses is provided with respect to the 3D face model. The default position may be assigned initially to two possible positions, one being "ON" position and the other being "OFF" position. According to one embodiment, an "ON" position, when selected, causes the selected glasses to be on the 3D face model in accordance with predetermined characteristics of the 3D face model. An "OFF" position, when selected, causes the selected glasses to be placed before but off the 3D face model in accordance with the predetermined characteristics of the 3D face model.

Figure 7:
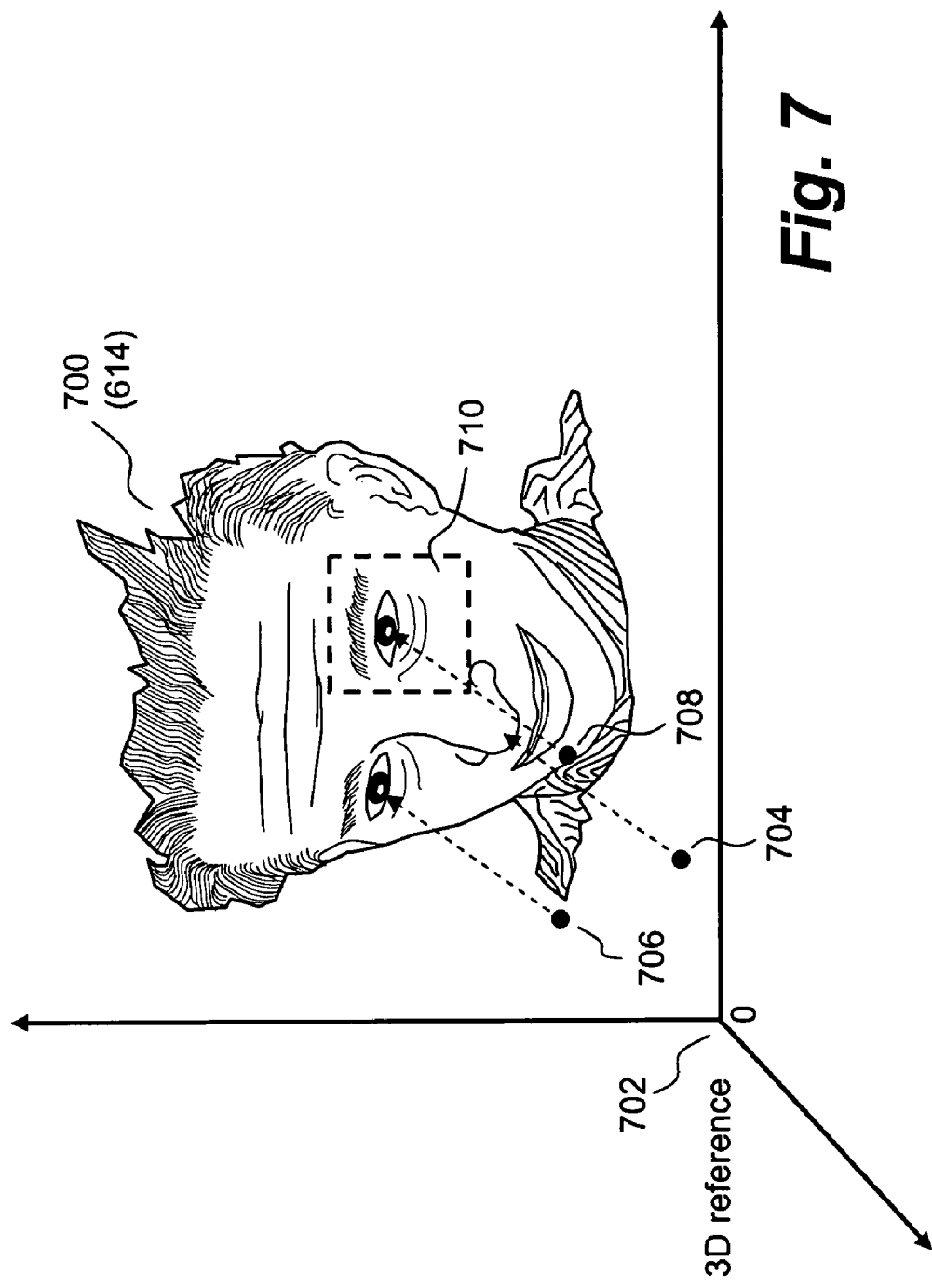
FIG. 7 shows an example of determining characteristics of a 3D face model, the characteristics including coordinates of a nose tip and pupils of the face model.

According to the embodiment, the characteristics of the 3D face model include 3D positions of the pupils and the nose tip of the 3D face model in a reference space or frame. Additionally a nose profile may be derived with reference to the nose tip to facilitate the try-on process. Referring now to FIG. 7, there is shown an illustration of determining the characteristics of the 3D face model 700. A 3D reference space or frame 702 is used to accommodate 3D face model 700. Nose tip 704 is determined from a most extended point of face model 700 and expressed as $(X_{nt}, Y_{nt}, Z_{nt})$. Using nose tip 704 as a starting point, an upward and left/right search in a localized window 710 can be conducted. A verification via color and/or texture of the pupils in the face model, e.g. in HIS color coordinates, can determine coordinates of the two pupils (e.g. black holes), expressed as $(X_{le}, Y_{le}, Z_{le})$ 706 and $(X_{re}, Y_{re}, Z_{re})$ 708. The coordinates are useful for scaling and/or orienting the 3D representation of the glasses so that the glasses can be graphically made fit to the 3D face. With the coordinates, the nose profile, especially around the area that holds the glasses, can be determined as well from the face model 700.

Figure 6B:
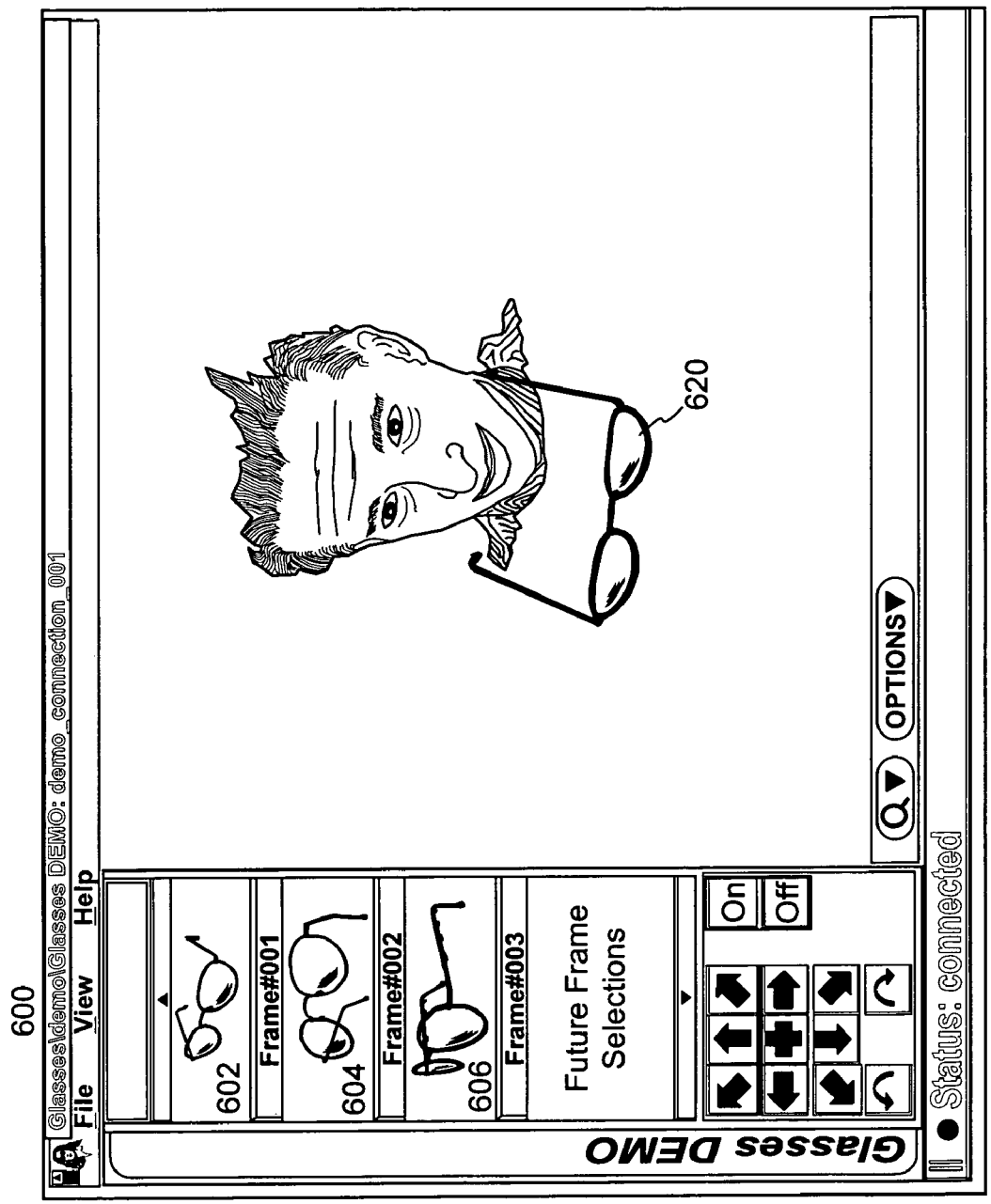

Referring now to FIG. 6B, there is shown that one of the glasses is chosen, a 3D representation 620 of the glasses is initially positioned at a default position (i.e. "OFF" position) before the 3D model (i.e. the face model). The default position in this case is to position the selected glass before but off the face model. The default position also includes a pre-fixed distance D (not shown in the figure) the glasses shall be initially positioned away from the face model. To ensure that the glasses and the face model coincide, for example, the orientations and/or sizes correspond, the characteristics of the face model is used to initially position and/or scale the 3D representation of the glasses.

Figure 6C:
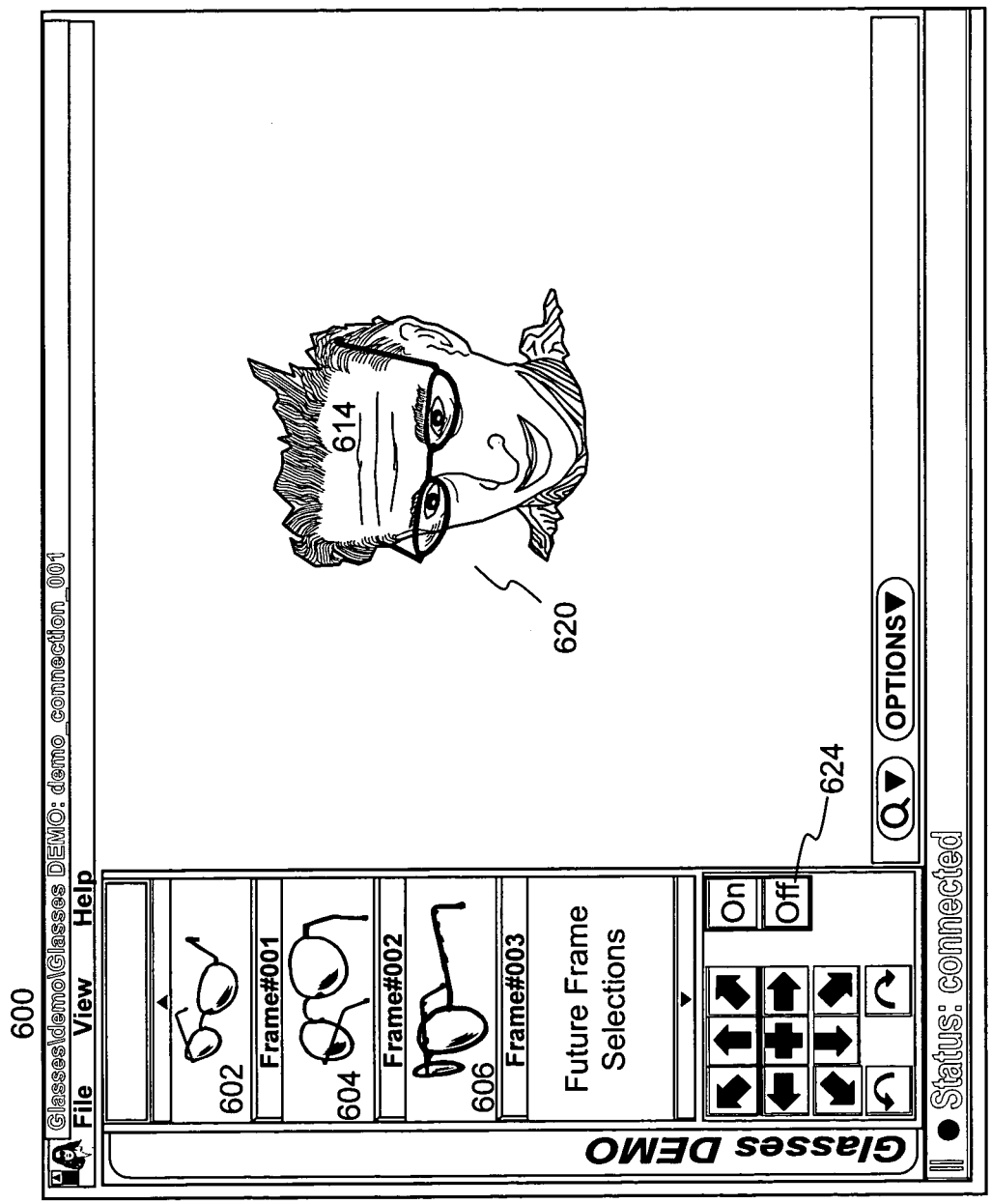

An "on" button 624 is not necessary but is desirable to automate wearing of the glasses on the face according to a calculated or predetermined default "ON" position. FIG. 6C shows that "on" button 624 is activated, which causes glasses 620 to move from "OFF" position to "ON" position. It should be noted that the "ON" position is a default position that is determined in accordance with the characteristics of the face model and may not be necessarily the way the user would wear the glasses.

Figure 6D:
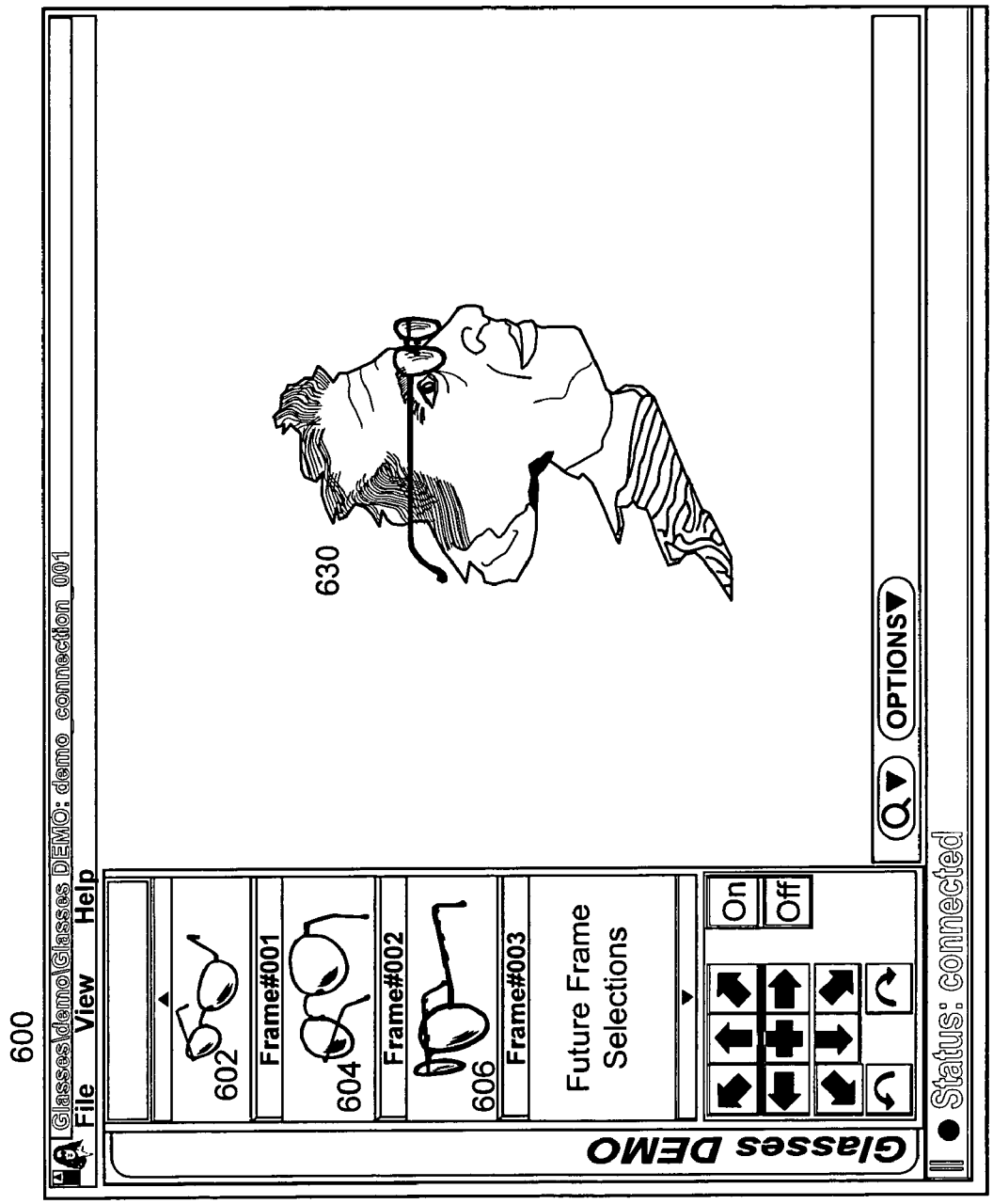
Figure 6E:
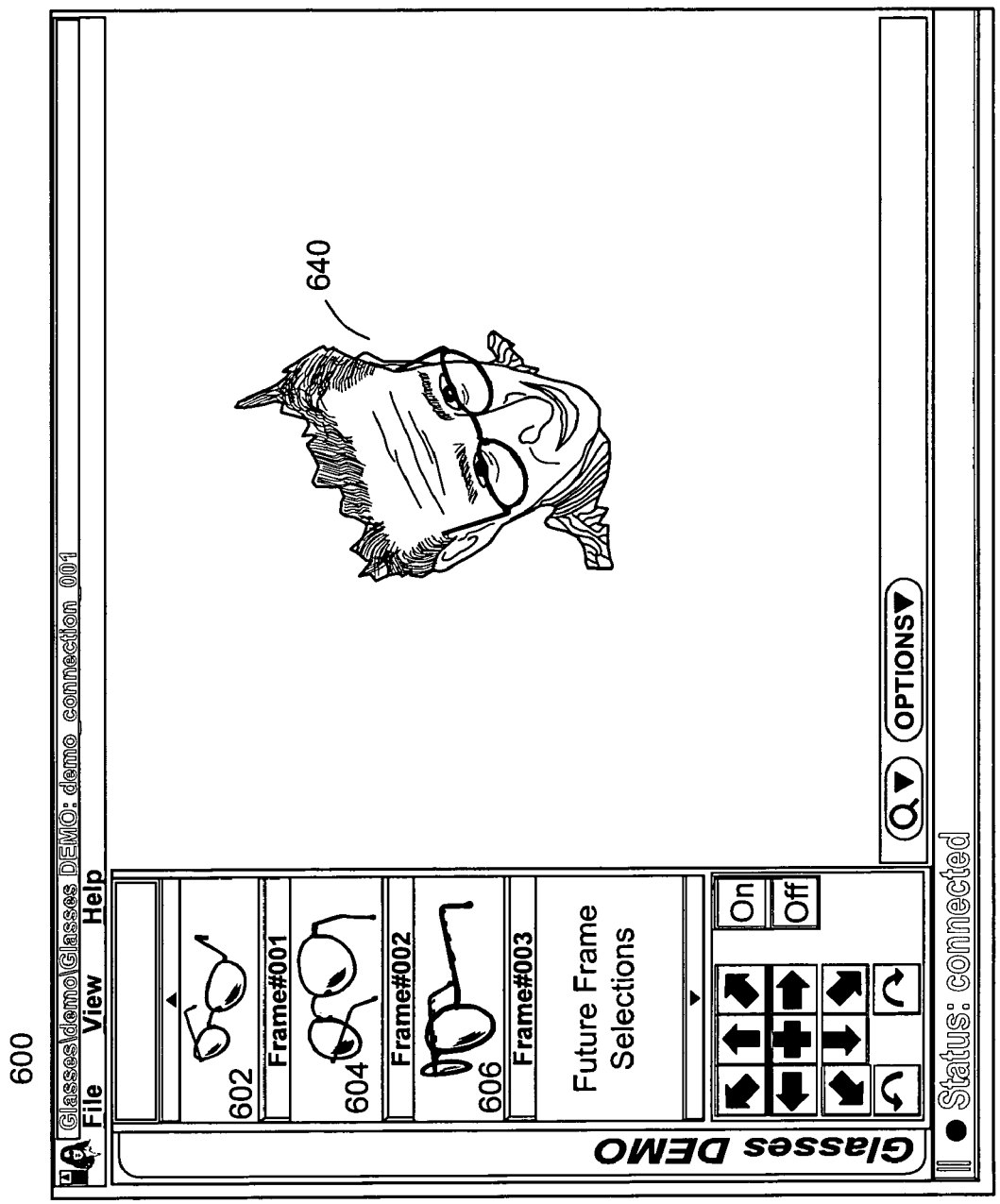

FIG. 6D shows that the user has "rotated" the face model with the glasses on to view from right side how he/she may look when the selected glasses are worn. The user may adjust the glasses up or down, left or right in accordance with a set of criteria that the user feels "right". FIG. 6E shows another perspective 640 where the user views how he may look like with the selected glasses on and may perform additional spatial adjustment.

Figure 8:
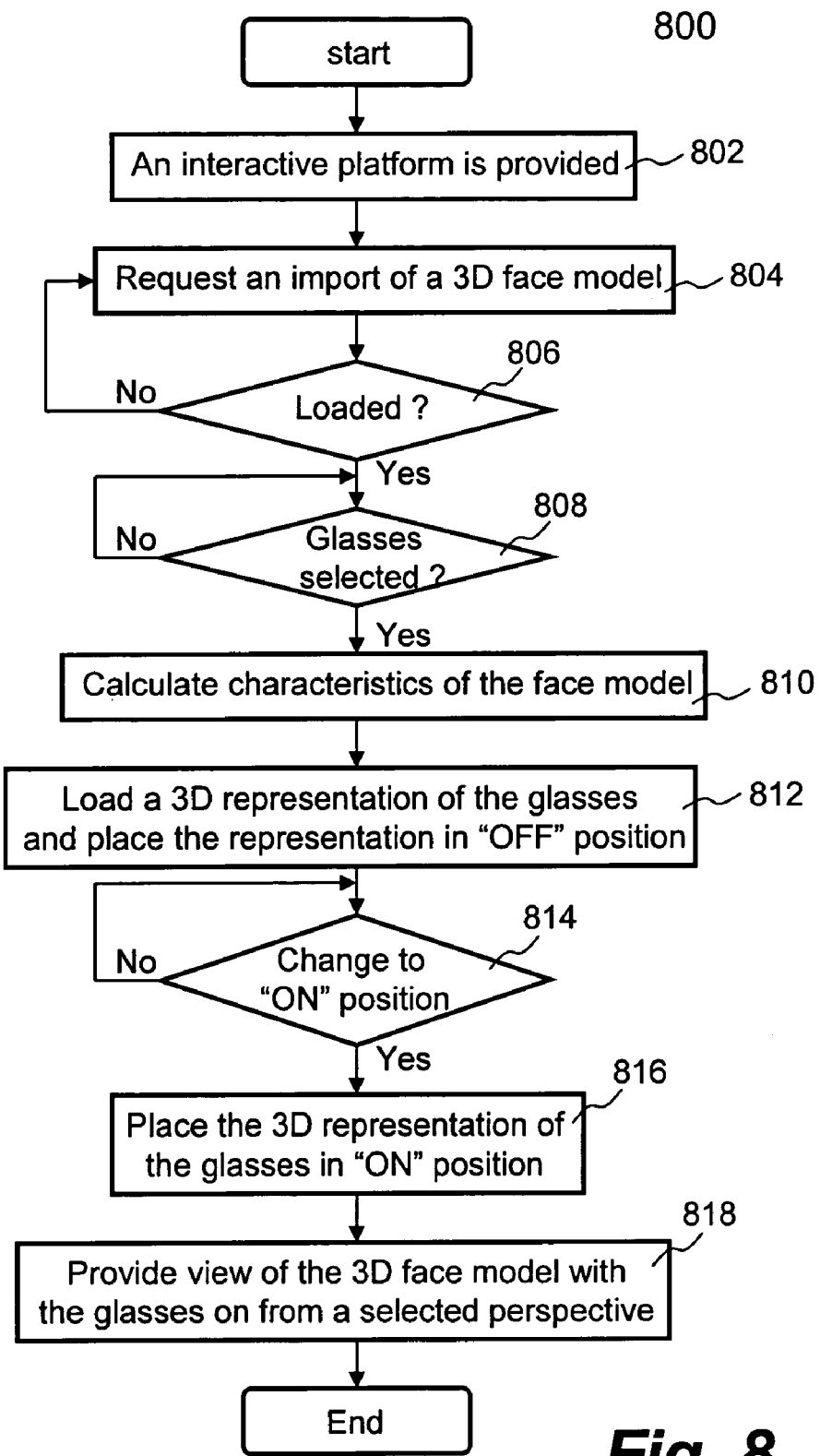
FIG. 8 shows a process flowchart of glasses fitting operations according to one embodiment of the present invention.

FIG. 8 shows a process flowchart of the glasses fitting operations according to one embodiment of the present invention. The process 800 in FIG. 8 is generally implemented in a client computing device coupled to a data network, such as the Internet, and used by a user who may be a potential buyer of eyeglasses. In one preferable embodiment, the user activates a browsing application (e.g. Microsoft Internet Explore) and provides an IP address identifying an eyeglass business web site (e.g. www.eyeglasses.com). Once connected, the computing device is provided or downloaded from the web site an interactive platform at 802. The interactive platform may correspond to the one 600 of FIG. 6A. Depending on an exact implementation, the interactive platform may include a panel consisting of respective displays of glasses of different style. By virtue of the present invention, at least one of the displays is associated with a 3D representation of the glasses. In other words, there is a 3D model of the glasses that can be uploaded to the computing device for testing or trying on if the pair of glasses is selected.

At 804, the platform requests an import of a 3D face model of a user who will preferably and ultimately buy and wear the glasses. The face model may be generated in real time, pre-generated or downloaded from another device/memory. Process 800 needs to ensure that an appropriate 3D face model is imported at 806. Once the 3D face model is accepted, process 800 awaits a selection from the user among the displays of glasses of various styles at 808. After a selection is made, the characteristics or the face model are computed at 810 by an application that may be embedded in the platform or in the web site. In a preferred embodiment, the application is an applet or script application that computes the characteristics including a number of parameters (e.g. the coordinates of the nose tip and pupils) from the face model to facilitate the try-on process. It should be noted that the computation of the characteristics of the face model may happen anywhere before an actual try-one process starts.

At 812, a 3D representation of the selected glasses is loaded into the platform from the network and places the glasses in front of but off the face model in accordance with the characteristics of the face model. In one implementation, the pair of glasses is initially placed a few inches away from the face but kept in parallel with the centers of the glasses lens coinciding with the pupils of the face model.

At 814, the user has an option to wear on the glasses by perhaps clicking a designated "On" button. Internally, at 816 the platform allows the glasses to move forward onto the face model in accordance with the characteristics of the face model to ensure that the pair of glasses is indeed "on" the face (not hanging on the face). In another embodiment that is further illustrated below, the pair of glasses is put onto the face model based on a set of position parameters that may have obtained from a previously selected pair of glasses. This feature will allow a newly selected pair of glasses to follow the positions a previously selected pair of glasses that has been adjusted. At 818, a combined view of the face model with the glasses on is provided and allows the user to view the combined view from any chosen perspective that may include a top, side, or front view.

Figure 9:
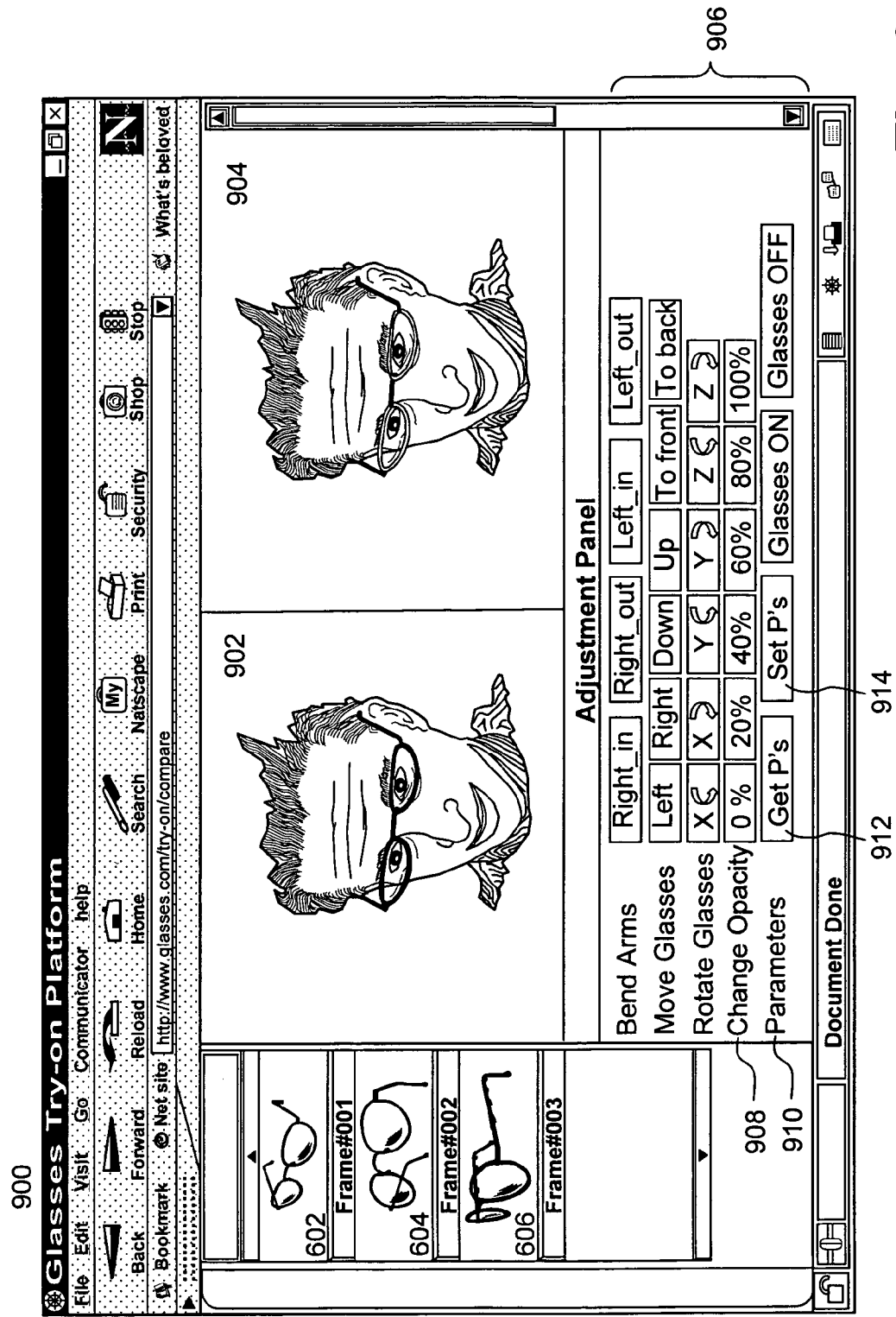
FIG. 9 shows an integrated display including two display windows, each allowing a user to load up a 3D face model, select a pair of glasses, perform spatial adjustments of the selected glasses with respect to the face model, wherein the integrated display allows the user to compare visually two different pairs of glasses side by side when they are respectively worn by the user.

FIG. 9 shows an interactive try-on platform 900 displayed by a popular browser. The exact display configurations may differ from one implementation to another. What is important is some of the features in the present invention being utilized in platform 900 to facilitate the try-on experiences by a user or a potential glasses wearer. Platform 900 shows that two display windows 902 and 904 are integrated therein. Each of the display windows allows the user to load up a 3D face model, select a pair of glasses, perform spatial adjustments of the selected glasses with respect to the face model as described above. One of the advantages for two display windows in a platform is to allow the user to compare visually two different pairs of glasses side by side when they are respectively worn by the user.

To assist the user to visually adjust the glasses on the face model, an adjustment panel 906 is provided. Panel 906 is an exemplary graphic user interface and includes a number of buttons that can be conveniently used by the user to adjust the glasses around the face model. For example, when "Right_in" is clicked or activated, the right arm of the glasses goes inward. If it appears that the glasses too tight, "Right_out" or "left_out" could be clicked to release the tightness. Panel 906 also includes respective buttons to spatially move the glasses in a reference 3D space, along/around the x, y or z direction.

As one of the features in platform 900, a graphic effect 908 is provided to affect the opacity of the lens in the glasses so that the user can determine what is the most appropriate lens opacity for the selected glasses. It should be noted that the 3D representation of the glasses does not have to include various opacities for the lenses. Those skilled in the art understand that a selected opacity can be graphically painted by choosing appropriate colors, in particular, appropriate pixel values.

In addition, parameter control 910 is provided to get or extract the position (i.e. the coordinates) of the glasses after the user has adjusted the glasses with respect to the 3D face model. The position may include information how a pair of glasses is positioned on the face model. According to one embodiment, the information includes a plurality of coordinates of some of the corners of the glasses, for example, the end of the two arms, the center of the glasses (e.g. with respect to the nose tip). According to platform 900, when "Get P's" is clicked, the coordinate information is obtained and saved in a memory space. When a new pair of glasses is selected, rather than performing another trial-and-error, the user can simply click "Set P's" to apply the collected coordinate information to the new pair of glasses. As a result, the new pair of glasses goes to the previously determined position.

The advantages of the invention are numerous. Different embodiments or implementations as a method, an apparatus or system may yield one or more of the following advantages. One of them is the interactive presentation mechanism desired by an online business to permit a user to try or test virtually a selected item for an object provided by the user. When the item is a wearable product and the object is the user himself/herself, the user can perceive how he/she may look like with the wearable product on. Another advantage or benefit provided by the present invention is the marketing opportunity of certain type of goods or services that would otherwise be limited to localities. With the present invention, these goods or services can be now offered online over the Internet so remote users can "feel" these goods or services.

The present invention has been described in sufficient detail with a certain degree of particularity. It is understood to those skilled in the art that the present disclosure of embodiments has been made by way of examples only and that numerous changes in the arrangement and combination of parts as well as steps may be resorted without departing from the spirit and scope of the invention as claimed. Accordingly, the scope of the present invention is defined by the appended claims rather than the forgoing description of embodiments.

What is claimed is:

1. A method for commercializing pairs of eyeglasses over a network, the method comprising:
    providing an interactive platform that can be displayed on a computing device;
    requesting a 3D face model from a user to be used in the interactive platform;
    determining characteristics of the 3D face model with respect to a 3D reference frame;
    retrieving a 3D representation of a pair of eyeglasses when a request identifying the pair of eyeglasses is received over the network; and
    placing the 3D representation of the glasses onto a default position with respect to the 3D face model in accordance with the characteristics thereof.

2. The method of claim 1 further comprising:
    permitting a relative interaction between the 3D representation of the glasses and the 3D face model.

3. The method of claim 1 further comprising:
    permitting a view of the 3D face model with the 3D representation of the glasses on from a chosen perspective.

4. The method of claim 1, wherein the interactive platform includes respective displays of the pairs of eyeglasses so that the user can choose one therefrom.

5. The method of claim 4, wherein the request is generated on the computing device when one of the pairs of eyeglasses is selected.

6. The method of claim 5, wherein the request conforms to a communication protocol in the network so that the request can be transported over the network from the computing device.

7. The method of claim 6, wherein the network is the Internet and the communication protocol is Hypertext Transfer Protocol (HTTP).

8. The method of claim 4, wherein the characteristics of the 3D face model include 3D positions of pupils and a nose profile of the 3D face model in reference to the 3D reference frame.

9. The method of claim 1, wherein the default position is either an "On" position or an "Off" position; and wherein the "On" position is to place the 3D representation of the glasses onto the 3D face model in accordance with the characteristics of the 3D face model, and the "Off" position is to place the 3D representation of the glasses off and in front of the 3D face model in accordance with the characteristics of the 3D face model.

10. The method of claim 1, wherein the requesting of the 3D face model comprises uploading the 3D face model from a known location by the user.

11. The method of claim 10, wherein the known location is a computing device that stores the 3D face model, or is used to generate the 3D face model.

12. A method for commercializing pairs of eyeglasses over a network, the method comprising:
    displaying on a display screen of a computing device an interactive platform received from the network, wherein the interactive platform includes respective 3D representations of the pairs of eyeglasses;
    importing into the interactive platform a 3D face model of a user;
    placing a 3D representation of one of the pairs of eyeglasses onto 3D face model when the one of the pairs of eyeglasses is selected on the display screen.

13. The method of claim 12, wherein the displaying of the interactive platform comprises:
    generating a request including an address identifying a web site hosted by an eyeglass business; and
    sending the request over the network.

14. The method of claim 13, wherein the network is the Internet; and wherein the request conforms substantially to Hypertext Transfer Protocol (HTTP).

15. The method of claim 13, wherein the importing of the 3D face model comprises:
    taking at least one image of the user; and
    activating a 3D modeling application to generate the 3D face model from the at least one image.

16. The method of claim 15, wherein the importing of the 3D face model further comprises determining characteristics of the 3D face model with respect to a 3D reference frame.

17. The method of claim 18, wherein the characteristic,s of the 3D face model include 3D positions of pupils and a nose profile of the 3D face model in reference to the 3D reference frame.

18. The method of claim 15, wherein the placing of the 3D representation of one of the pairs of eyeglasses onto 3D face model comprises:
    placing the 3D representation of the glasses onto a default position with respect to the 3D face model in accordance with the characteristics thereof.

19. The method of claim 18, wherein the default position is either an "On" position or an "Off" position; and wherein the "On" position is to place the 3D representation of the glasses onto the 3D face model in accordance with the characteristics of the 3D face model, and the "Off" position is to place the 3D representation of the glasses off and in front of the 3D face model in accordance with the characteristics of the 3D face model.

20. The method of claim 12 further comprising providing a relative interaction between the 3D presentation of the glasses and the 3D face model.

21. The method of claim 12 further comprising providing a view of the 3D face model with the 3D representation of the glasses on from a chosen perspective.

22. A method for commercializing pairs of eyeglasses over a network, the method comprising:
    displaying an interactive platform received from the network, wherein the interactive platform includes at least two views, a first view and a second view, each of the two views receiving a 3D face model provided bye user; and placing a 3D representation of one of the pairs of eyeglasses onto the 3D face model in the first view and placing a 3D representation of another one of the pairs of eyeglasses onto the 3D face model in the second view so that the user can appreciate any differences between the two views.

23. The method of claim 22, wherein the interactive platform further includes a panel comprising a plurality of functional buttons, at least some of the buttons provided to assist the user to spatially adjust either the one of the pairs of eyeglasses or the another one of the pairs of eyeglasses with respect to the 3D face model.

24. The method of claim 22, wherein the interactive platform further includes a panel comprising a plurality of functional buttons, at least some of the buttons provided to retrieve position information of either the one of the pairs of eyeglasses or the another one of the pairs of eyeglasses, where in the position information can be applied to a newly selected pair of eyeglasses.

25. A system for commercializing pairs of eyeglasses over a network, the system comprising:
    a client computing device including a display screen, executing a browsing application and coupled to a data network;
    a server computing device operated by an eyewear business, the server computing device accessing a database of the pairs of eyeglasses; and
    wherein the client computing device, in response to an IP address identifying the server computing device, sends out a specification of a selected pair of the pairs of eyeglasses after a data link is established between the client and server computing devices;
    wherein the client computing device subsequently displays an interactive try-on platform in which a 3D face model of a user and a 3D representation of the selected pair of eyeglasses are displayed; and
    wherein the user is able to virtually place the selected pair of eyeglasses on or off the 3D face model.

26. The system of claim 25, wherein the 3D face model is uploaded into the platform from a location known to the user.

27. The system of claim 26, wherein the location known to the user includes a computing device that stores the 3D face model, or is used to generate the 3D face model.

28. The system of claim 27, wherein the computing device is either one of the client or the server computing devices.

29. A software product for commercializing pairs of eyeglasses over a network, the software product on a computer readable medium executable on a computing device and comprising:
    program code for providing an interactive platform that can be displayed on a computing device;
    program code for requesting a 3D face model from a user;
    program code for determining characteristics of the 3D face model with respect to a 3D reference frame;
    program code for retrieving a 3D representation of a pair of eyeglasses when a request identifying the pair of eyeglasses is received over the network; and
    program code for placing the 3D representation of the glasses onto a default position with respect to the 3D face model in accordance with the characteristics thereof.

30. The software product of claim 29 further comprising:
    program code for permitting a relative interaction between the 3D representation of the glasses and the 3D face model; and
    program code for permitting a view of the 3D face model with the 3D representation of the glasses on from a chosen perspective.

31. The software product of claim 29, wherein the interactive platform includes respective displays of the pairs of eyeglasses so that the user can choose one therefrom.

32. The software product of claim 29, wherein the characteristics of the 3D face model include 3D positions of pupils and a nose profile of the 3D face model in reference to the 3D reference frame.

33. The software product of claim 29, wherein the default position is either an "On" position or an "Off" position; and wherein the "On" position is to place the 3D representation of the glasses onto the 3D face model in accordance with the characteristics of the 3D face model, and the "Off" position is to place the 3D representation of the glasses off and in front of the 3D face model in accordance with the characteristics of the 3D face model.

34. The software product of claim 29, wherein the program code for requesting of the 3D face model comprises program code for uploading the 3D face model from a known location by the user.

* * * * *

EX PARTE REEXAMINATION CERTIFICATE (10225th)
United States Patent
Waupotitsch et al.

(10) Number: US 7,016,824 C1
(45) Certificate Issued: Jul. 21, 2014

(54) INTERACTIVE TRY-ON PLATFORM FOR EYEGLASSES

(75) Inventors: Roman Waupotitsch, San Jose, CA (US); Mikhail Tsoupko-Sitnikov, Campbell, CA (US); Gérard G. Medioni, Los Angeles, CA (US); Oleg Mishin, Foster City, CA (US); Vladimir Shamgin, Cupertino, CA (US); Francesco Callari, Campbell, CA (US); David Guigonis, San Jose, CA (US)

(73) Assignee: 1-800 Contacts, Inc., Draper, UT (US)

Reexamination Request:
No. 90/013,060, Nov. 14, 2013

Reexamination Certificate for:
Patent No.: 7,016,824
Issued: Mar. 21, 2006
Appl. No.: 09/823,422
Filed: Mar. 29, 2001

Related U.S. Application Data

(60) Provisional application No. 60/266,799, filed on Feb. 6, 2001.

(51) Int. Cl.
*G06G 7/48* (2006.01)

(52) U.S. Cl.
USPC ............... 703/6; 345/419; 345/630; 382/145; 703/1

(58) Field of Classification Search
None
See application file for complete search history.

(56) References Cited

To view the complete listing of prior art documents cited during the proceeding for Reexamination Control Number 90/013,060, please refer to the USPTO's public Patent Application Information Retrieval (PAIR) system under the Display References tab.

*Primary Examiner* — Mary Steelman

(57) ABSTRACT

Techniques and systems that provide interactions between a 3D representation of a selected pair of glasses and a fully-textured 3D face model are disclosed. According to one embodiment, an interactive platform is displayed to allow a user to select a pair of glasses and try the selected glasses on a user-provided 3D face model. The interactions provided in the platform include spatial adjustments of the glasses around the face model, various perspective views of the 3D face with the glasses on and other cosmetic alternations to the selected glasses. According to one application, when the user finishes the try-on process, the information about the glasses can be transmitted to a business that can subsequently produce a pair of customized glasses for the user.

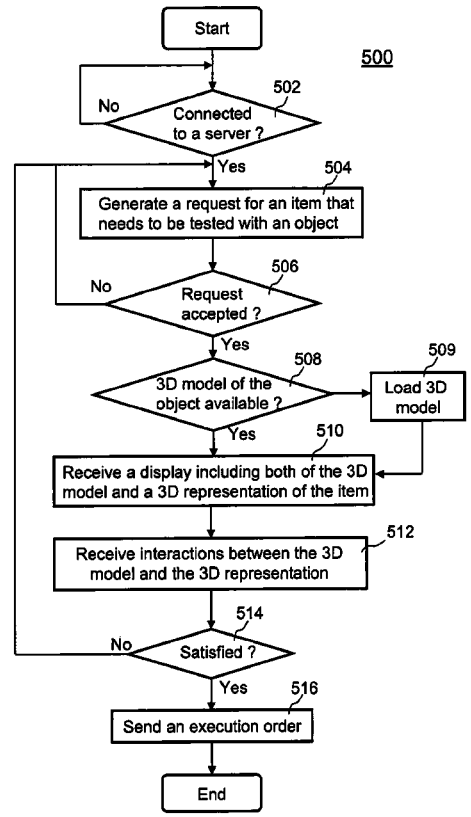

US 7,016,824 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-11 and 25-34 is confirmed.

Claims 12 and 22 are determined to be patentable as amended.

Claims 13-21 and 23-24, dependent on an amended claim, are determined to be patentable.

New claims 35-48 are added and determined to be patentable.

12. A method for commercializing pairs of eyeglasses over a network, the method comprising:
  displaying on a display screen of a computing device an interactive platform received from the network, wherein the interactive platform includes respective 3D representations of the pairs of eyeglasses;
  importing into the interactive platform a 3D face model of a user; *and*
  placing a 3D representation of one of the pairs of eyeglasses onto *the* 3D face model when the one of the pairs of eyeglasses is selected on the display screen.

22. A method for commercializing pairs of eyeglasses over a network, the method comprising:
  displaying an interactive platform received from the network, wherein the interactive platform includes at least two views, a first view and a second view, each of the two views receiving a 3D face model provided [bye] *by a* user; and
  placing a 3D representation of one of the pairs of eyeglasses onto the 3D face model in the first view and placing a 3D representation of another one of the pairs of eyeglasses onto the 3D face model in the second view so that the user can appreciate any differences between the two views.

*35. The method of claim 22, wherein the placing of the 3D representation of one of the pairs of eyeglasses onto the 3D face model comprises:*
  *placing the 3D representation of the glasses onto a default position with respect to the 3D face model in accordance with characteristics of the 3D face model, the characteristics determined with respect to a 3D reference frame.*

*36. The system of claim 25, wherein the user is able to virtually place the 3D representation of the selected pair of eyeglasses onto a default position with respect to the 3D face model in accordance with characteristics of the 3D face model, the characteristics determined with respect to a 3D reference frame.*

*37. A system for commercializing pairs of eyeglasses over a network, the system comprising:*
  *a client computing device including a display screen, executing a browsing application and coupled to a data network; and*
  *a server computing device operated by an eyewear business, the server computing device accessing a database of the pairs of eyeglasses,*
  *wherein the client computing device, in response to an IP address identifying the server computing device, sends out a specification of a selected pair of the pairs of eyeglasses after a data link is established between the client and server computing devices,*
  *wherein the client computing device subsequently displays an interactive try-on platform in which a 3D face model of a user and a 3D representation of the selected pair of eyeglasses are displayed, and*
  *wherein the user is able to virtually place the selected pair of eyeglasses on and off the 3D face model.*

*38. A method for commercializing pairs of eyeglasses over a network, the method comprising:*
  *displaying on a display screen of a computing device an interactive platform received from the network, wherein the interactive platform includes respective 3D representations of the pairs of eyeglasses;*
  *importing into the interactive platform a 3D face model of a user; and*
  *after the importing, placing, on the interactive platform, a 3D representation of one of the pairs of eyeglasses onto the 3D face model when the one of the pairs of eyeglasses is selected on the display screen.*

*39. The method of claim 38, wherein the displaying of the interactive platform comprises:*
  *generating a request including an address identifying a web site hosted by an eyeglass business; and*
  *sending the request over the network.*

*40. The method of claim 39, wherein the network is the Internet; and*
  *wherein the request conforms substantially to Hypertext Transfer Protocol (HTTP).*

*41. The method of claim 38, wherein the importing of the 3D face model comprises:*
  *taking at least one image of the user; and*
  *activating a 3D modeling application to generate the 3D face model from the at least one image.*

*42. The method of claim 41, further comprising:*
  *determining characteristics of the 3D face model with respect to a 3D reference frame.*

*43. The method of claim 42, wherein the placing of the 3D representation of one of the pairs of eyeglasses onto the 3D face model comprises:*
  *placing the 3D representation of the glasses onto a default position with respect to the 3D face model in accordance with the characteristics thereof.*

*44. The method of claim 43, wherein the characteristics of the 3D face model include 3D positions of pupils and a nose profile of the 3D face model in reference to the 3D reference frame.*

*45. The method of claim 43, wherein the default position is either an "On" position or an "Off" position; and wherein the "On" position is to place the 3D representation of the glasses onto the 3D face model in accordance with the characteristics of the 3D face model, and the "Off" position is to place the 3D representation of the glasses off and in front of the 3D face model in accordance with the characteristics of the 3D face model.*

*46. The method of claim 38, further comprising providing a relative interaction between the 3D presentation of the glasses and the 3D face model.*

*47. The method of claim 38, further comprising a view of the 3D face model with the 3D representation of the glasses on from a chosen perspective.*

48. The method of claim 38, further comprising providing a first view of the 3D face model; and
placing a 3D representation of another one of the pairs of eyeglasses onto the 3D face model in a second view so that the user can appreciate any differences between the two views.

* * * * *